(12) United States Patent
Garudadri et al.

(10) Patent No.: US 8,855,059 B2
(45) Date of Patent: *Oct. 7, 2014

(54) METHOD AND APPARATUS FOR ALLOCATION OF INFORMATION TO CHANNELS OF A COMMUNICATION SYSTEM

(75) Inventors: Harinath Garudadri, San Diego, CA (US); Phoom Sagetong, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1664 days.

This patent is subject to a terminal disclaimer.

(21) Appl. No.: 11/129,687

(22) Filed: May 13, 2005

(65) Prior Publication Data

US 2005/0259613 A1 Nov. 24, 2005

Related U.S. Application Data

(60) Provisional application No. 60/571,673, filed on May 13, 2004.

(51) Int. Cl.
*H04W 4/00* (2009.01)
(Continued)

(52) U.S. Cl.
CPC ............... *H04L 47/36* (2013.01); *H04L 29/06* (2013.01); *H04L 29/06027* (2013.01);
(Continued)

(58) Field of Classification Search
USPC ......... 370/310, 312–314, 328–330, 335–338, 370/341–345, 347–350, 441–447, 458–459, 370/461–462, 468–474, 477, 521, 543–545, 370/912–916, 395.1–395.72; 455/403, 455/422.1, 560–561, 450–451, 464, 466, 455/41.2, 72, 550.1, 556.2; 209/247; 386/101–102; 375/E7.134, E7.138, 375/E7.141, E7.222, 240.01; 725/90, 62
See application file for complete search history.

(56) References Cited

U.S. PATENT DOCUMENTS 5,537,409 A * 7/1996 Moriyama et al. ............ 370/471
5,541,852 A 7/1996 Eyuboglu et al.
(Continued)

FOREIGN PATENT DOCUMENTS

EP 0424903 5/1991
EP 1564992 8/2005
(Continued)

OTHER PUBLICATIONS

International Preliminary Report on Patentability—PCT/US05/016838, International Preliminary Examining Authority—United States Office—Jan. 24, 2007.

(Continued)

*Primary Examiner* — Daniel Lai
(74) *Attorney, Agent, or Firm* — Donald C. Kordich

(57) ABSTRACT

Methods and apparatus are described for improving the transmission of information over wireless communication channels. These techniques include determining available communication channels for transmitting information and determining possible physical layer packet sizes of the available channels. An information unit is partitioned into portions wherein the size of the portions are selected so as to match one of the physical layer packet sizes of the available communication channels. Another aspect is partitioning the information into a number of slices that correspond to the number of transmissions that occur during the information unit interval and assigning each partition to a corresponding transmission. The techniques can be used for various types of information, such as multimedia data, variable bit rate data streams, video data, or audio data. The techniques can also be used with various over the air interfaces, such as, Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

67 Claims, 17 Drawing Sheets

(51) Int. Cl.

| | | |
|---|---|---|
| *H04L 29/06* | (2006.01) | |
| *H04L 12/805* | (2013.01) | |
| *H04N 21/61* | (2011.01) | |
| *H04N 19/102* | (2014.01) | |
| *H04N 19/164* | (2014.01) | |
| *H04N 21/6437* | (2011.01) | |
| *H04N 19/115* | (2014.01) | |
| *H04N 19/174* | (2014.01) | |
| *H04N 21/414* | (2011.01) | |
| *H04N 19/61* | (2014.01) | |
| *H04N 19/152* | (2014.01) | |
| *H04N 21/2381* | (2011.01) | |
| *H04W 28/06* | (2009.01) | |
| *H04N 19/124* | (2014.01) | |
| *H04N 21/647* | (2011.01) | |
| *H04W 88/18* | (2009.01) | |
| *H04W 72/12* | (2009.01) | |
| *H04W 80/00* | (2009.01) | |
| *H04W 84/04* | (2009.01) | |
| *H04N 21/4788* | (2011.01) | |
| *H04N 21/44* | (2011.01) | |

(52) U.S. Cl.
CPC ..... *H04N 21/6181* (2013.01); *H04N 19/00012* (2013.01); *H04W 72/1263* (2013.01); *H04L 69/166* (2013.01); *H04N 19/00236* (2013.01); *H04N 21/6437* (2013.01); *H04N 19/0006* (2013.01); *H04N 21/6131* (2013.01); *H04N 19/00272* (2013.01); *H04N 21/41407* (2013.01); *H04W 80/00* (2013.01); *H04N 19/00781* (2013.01); *H04N 19/00193* (2013.01); *H04L 69/161* (2013.01); *H04N 21/2381* (2013.01); *H04W 84/04* (2013.01); *H04W 28/065* (2013.01); *H04L 69/04* (2013.01); *H04L 65/80* (2013.01); *H04N 19/0009* (2013.01); *H04L 69/22* (2013.01); *H04N 21/4788* (2013.01); *H04L 65/604* (2013.01); *H04N 21/64707* (2013.01); *H04N 21/44004* (2013.01); *H04W 88/181* (2013.01); *H04W 28/06* (2013.01)
USPC ...... 370/329; 455/450; 455/422.1; 370/395.1

(56) References Cited

U.S. PATENT DOCUMENTS

| | | | |
|---|---|---|---|
| 5,559,608 A | 9/1996 | Kunihiro | |
| 5,570,372 A | 10/1996 | Shaffer | |
| 5,583,652 A | 12/1996 | Ware | |
| 5,717,464 A * | 2/1998 | Perkins et al. | 375/240.05 |
| 5,729,534 A | 3/1998 | Jokinen et al. | |
| 5,844,600 A | 12/1998 | Kerr | |
| 5,867,230 A * | 2/1999 | Wang et al. | 348/425.2 |
| 5,898,695 A | 4/1999 | Fujii et al. | |
| 6,023,552 A | 2/2000 | Kunihiro | |
| 6,041,067 A | 3/2000 | Takamori et al. | |
| 6,058,141 A | 5/2000 | Barger et al. | |
| 6,085,270 A * | 7/2000 | Gulick | 710/100 |
| 6,108,626 A * | 8/2000 | Cellario et al. | 704/230 |
| 6,111,916 A * | 8/2000 | Talluri et al. | 375/240.23 |
| 6,181,711 B1 | 1/2001 | Zhang et al. | |
| 6,473,404 B1 | 10/2002 | Kaplan et al. | |
| 6,473,442 B1 | 10/2002 | Lundsjö | |
| 6,496,504 B1 | 12/2002 | Malik | |
| 6,535,043 B2 | 3/2003 | Chen | |
| 6,535,557 B1 * | 3/2003 | Saito et al. | 375/240.1 |
| 6,536,043 B1 * | 3/2003 | Guedalia | 725/90 |
| 6,542,481 B2 | 4/2003 | Foore et al. | |
| 6,564,382 B2 | 5/2003 | Duquesnois | |
| 6,584,125 B1 | 6/2003 | Katto | |
| 6,647,006 B1 | 11/2003 | Rasanen | |
| 6,680,955 B1 | 1/2004 | Le | |
| 6,704,281 B1 | 3/2004 | Hourunranta et al. | |
| 6,920,118 B2 | 7/2005 | Lozano | |
| 6,956,875 B2 | 10/2005 | Kapadia et al. | |
| 6,968,091 B2 | 11/2005 | Faibish et al. | |
| 7,016,337 B1 | 3/2006 | Wu et al. | |
| 7,043,749 B1 | 5/2006 | Davies | |
| 7,068,708 B2 | 6/2006 | LaRosa et al. | |
| 8,089,948 B2 | 1/2012 | Garudadri et al. | |
| 2001/0008535 A1 | 7/2001 | Lanigan | |
| 2002/0105976 A1 | 8/2002 | Kelly et al. | |
| 2002/0131426 A1 | 9/2002 | Amit et al. | |
| 2002/0137521 A1 | 9/2002 | Kim et al. | |
| 2002/0150123 A1 | 10/2002 | Ro | |
| 2002/0159457 A1 * | 10/2002 | Zhang et al. | 370/391 |
| 2002/0194606 A1 | 12/2002 | Tucker et al. | |
| 2003/0021298 A1 | 1/2003 | Murakami et al. | |
| 2003/0039465 A1 | 2/2003 | Bjorgan et al. | |
| 2003/0053484 A1 | 3/2003 | Sorenson et al. | |
| 2003/0107998 A1 * | 6/2003 | Mowery et al. | 370/252 |
| 2003/0140347 A1 * | 7/2003 | Varsa | 725/90 |
| 2003/0208615 A1 * | 11/2003 | Rousseau et al. | 709/233 |
| 2003/0224806 A1 * | 12/2003 | Hebron | 455/457 |
| 2004/0052209 A1 | 3/2004 | Ortiz | |
| 2004/0057446 A1 | 3/2004 | Varsa et al. | |
| 2004/0078744 A1 * | 4/2004 | Wei et al. | 714/752 |
| 2004/0264489 A1 * | 12/2004 | Klemets et al. | 370/428 |
| 2005/0047417 A1 | 3/2005 | Lee et al. | |
| 2005/0094655 A1 | 5/2005 | Newson et al. | |
| 2005/0105615 A1 | 5/2005 | El-Maleh et al. | |
| 2005/0172154 A1 * | 8/2005 | Short et al. | 713/201 |
| 2005/0220071 A1 | 10/2005 | Sivalingham et al. | |
| 2005/0226262 A1 | 10/2005 | Hsieh et al. | |
| 2005/0259623 A1 | 11/2005 | Garudadri et al. | |
| 2005/0259694 A1 | 11/2005 | Garudadri et al. | |
| 2006/0285654 A1 | 12/2006 | Nesvadba et al. | |
| 2007/0092224 A1 | 4/2007 | Tsukagoshi et al. | |
| 2008/0002669 A1 | 1/2008 | O'brien et al. | |

FOREIGN PATENT DOCUMENTS

| | | |
|---|---|---|
| JP | 2000-196634 | 7/2000 |
| JP | 2004226272 | 8/2004 |
| KR | 1997012585 | 3/1997 |
| KR | 20010024530 | 4/2000 |
| KR | 20010024531 | 4/2000 |
| KR | 20020044169 | 4/2002 |
| KR | 20030088054 | 11/2003 |
| WO | 9528684 | 10/1995 |
| WO | 0021321 | 4/2000 |
| WO | 0078054 | 12/2000 |
| WO | 0152553 | 7/2001 |
| WO | 0152565 | 7/2001 |
| WO | 0205575 | 1/2002 |
| WO | 0215591 | 2/2002 |
| WO | 0223745 | 3/2002 |
| WO | 0223916 | 3/2002 |
| WO | 03041326 A2 | 5/2003 |

OTHER PUBLICATIONS

International Search Report—PCT/US05/016838, International Search Authority—European Patent Office—International Search Report—PCT/US05/016838, International Search Authority—European Patent Office—Sep. 21, 2005.
Written Opinion—PCT/US05/016838, International Search Authority—European Patent Office—Sep. 21, 2005.
Formulasys, "The Basics of Wireless", Dec. 21, 2003, pp. 1-16.
Jonsson: "Zero Byte ROHC RTP", Ericsson Research, Lulea Sweden, Mar. 23, 2001.
Svanbro: "Lower Layer Guidelines for Robust RTP UDP IP Header Compression", IETF Standard, Internet Engineering Task Force, IETF, CH,Networking Working Group, 3409 Ericsson, Dec. 2002, XP015009203.
3GPP TS 45.002 , V6.9.0 (Apr. 2005); 3rd Generation Partnership Project; Technical Specification Group GSM/EDGE Radio Access

(56) References Cited

OTHER PUBLICATIONS

Network; Multiplexing and multiple access on the radio path (Release 6).
Borman, "Robust Header Compression", RFAC 3095, Jul. 2001, pp. 1-157.
Garudadri, et al., "Video Transport over Wireless Networks," 2004, ACM, all pages.
Formulasys, The Basics of Wireless, p. 3-16, 2002.
Kikuchi, et al., "RTP Payload Format for MPEG-4 Audio/Visual Streams," Network Working Group, RFC 3016, Nov. 2000, 20 pp.
Schulzrinne, et al.,"RTP: A Transport Protocol for Real-Time Applications," IETF RFC 3550 (Jul. 2003).
Nanda S., et al., "Video Transport Over Wireless Networks", ACM Multimedia MM'04, Oct. 10, 2004-Oct. 16, 2004, pp. 416-419, XP002683328, New York, USA, Chapter 2. cdma2000 Logical Channel for EBR.
Taiwan Search Report—TW094115822—TIPO—Apr. 10, 2012.
Yallapragada R., et al., "Video Delivery Over Cellular Wireless Networks using EBR Techniques", Personal Wireless Communications, 2005. ICPWC 2005. 2005 IEEE International Conference on New Delhi, India Jan. 23-25, 2005, Piscataway, NJ, USA, IEEE, Jan. 23, 2005, pp. 249-253, XP010798556.
Pyun, J.Y., et al., "Wireless Measurement Based Resource Allocation for QoS Provisioning over IEEE 802.11 Wireless LAN", IEEE Trans. on Consumer Electronics, Aug. 2003, vol. 49, No. 3, pp. 614-620.

\* cited by examiner

METHOD AND APPARATUS FOR ALLOCATION OF INFORMATION TO CHANNELS OF A COMMUNICATION SYSTEM

CLAIM OF PRIORITY UNDER 35 U.S.C §119

The present Application for Patent claims priority to U.S Provisional Application No. 60/571,673, entitled "Multimedia Packets Carried by CDMA Physical Layer Products", filed May 13, 2004, and assigned to the assignee hereof and hereby expressly incorporated by reference herein

REFERENCE TO CO-PENDING APPLICATIONS FOR PATENT

The present Application for Patent is related to the following co-pending U.S. Patent Applications:
"Delivery Of Information Over A Communication Channel", Ser. No. 11/129,625, filed concurrently herewith, assigned to the assignee hereof, and expressly incorporated in its entirety by reference herein; and
"Header Compression Of Multimedia Data Transmitted Over A Wireless Communication System", Ser. No. 11/129,735, filed concurrently herewith, assigned to the assignee hereof, and expressly incorporated in its entirety by reference herein; and
"Synchronization Of Audio And Video Data In A Wireless Communication System", Ser. No. 11/129,635, filed concurrently herewith, assigned to the assignee hereof, and expressly incorporated in its entirety by reference herein.

BACKGROUND

I. Field

The present invention relates generally to delivery of information over a communication system, and more specifically, to partitioning of information units to match a physical layer packet of a constant bit rate communication link.

II. Background

Demand for the delivery of multimedia data over various communication networks is increasing. For example, consumers desire the delivery of streaming video over various communication channels, such as the Internet, wire-line and radio networks. Multimedia data can be different formats and data rates, and the various communication networks use different mechanisms for transmission of real time data over their respective communication channels.

One type of communication network that has become commonplace is mobile radio networks for wireless communications. Wireless communication systems have many applications including, for example, cellular telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including frequency division multiple access (FDMA), time division multiple access (TDMA), and code division multiple access (CDMA).

Different domestic and international standards have been established to support the various air interfaces including, for example, Advanced Mobile Phone Service (AMPS), Global System for Mobile (GSM), General Packet Radio Service (GPRS), Enhanced Data GSM Environment (EDGE), Interim Standard 95 (IS-95) and its derivatives, IS-95A, IS-95B, ANSI J-STD-008 (often referred to collectively herein as IS-95), and emerging high-data-rate systems such as cdma 2000, Universal Mobile Telecommunications Service (UMTS), and wideband CDMA, (WCDMA). These standards are promulgated by the Telecommunication Industry Association (TIA), 3rd Generation partnership Project (3GPP), European Telecommunication Standards Institute (ETSI), and other well-known standards bodies.

Users, or customers, of mobile radio networks, such as cellular telephone networks, would like to receive streaming media such as video, multimedia, and Internet Protocol (IP) over a wireless communication link. For example, customers desire to be able to receive streaming video, such as a teleconference or television broadcasts, on their cell phone or other portable wireless communication device. Other examples of the type of data that customers desire to receive with their wireless communication device include multimedia multicast/broadcast and Internet access.

There are different types of sources of multimedia data and different types of communication channels on which it is desired to transmit the streaming data. For example, a multimedia data source can produce data at a constant bit rate (CBR) or a variable bit rate (VBR). In addition, the communication channel can transmit data at a CBR or a VBR. Table 1 below list various combinations of data sources and communication channels.

TABLE 1

| Source | Channel | Example |
| --- | --- | --- |
| CBR | CBR | mu-law, or A-law on PSTN |
| VBR | VBR | MPEG-4 over wire-line IP network, cdma2000 variable rate vocoders such as 13K vocoder, EVRC and SMV over fundamental channel (FCH) |
| CBR | VBR | AMR streaming on cdma2000 FCH |
| VBR | CBR | Compressed video over circuit switched Wireless networks (3G-324M) |

Communication channels typically transmit data in chunks, which we refer to as physical layer packets or physical layer frames. The data generated by the multimedia source may be a continuous stream of bytes, such as a voice signal encoded using the mu-law or A-law. More frequently, the data generated by the multimedia source consists in groups of bytes, called data packets. For example, an MPEG-4 video encoder compresses visual information as a sequence of information units, which we refer herein as video frames. Visual information is typically encoded at a constant video frame rate by the encoder, of typically 25 or 30 Hz, and must be rendered at the same rate by the decoder. The video frame period is the time between two video frames and can be computed as the inverse of the video frame rate, for example the video frame period of 40 ms corresponds to a video frame rate of 25 Hz. Each video frame is encoded into a variable number of data packets, and all the data packets are transmitted to the decoder. If a portion of a data packet is lost, that packet becomes unusable by the decoder. On the other hand, the decoder may reconstitute the video frame even if some of the data packets are lost, but at the cost of some quality degradation in the resulting video sequence. Each data packet therefore contains part of the description of the video frame, and the number packets are therefore variable from one video frame to another.

In the case when a source produces data at a constant bit rate and a communication channel transmits data at a constant rate, the communication system resources are efficiently utilized, assuming that the communication channel data rate is at least as fast as the source data rate, or if the two data rates are otherwise matched. In other words, if the constant data rate of the source is the same as the constant data rate of the channel, then the resources of the channel can be fully utilized, and the source data can be transmitted with no delay. Likewise, if the source produces data at a variable rate and the channel transmits at a variable rate, then as long as the channel data rate can support the source data rate, then the two data rates can be matched and, again, the resources of the channel are fully utilized and all of the source data can be transmitted with no delay.

If the source produces data at a constant data rate and the channel is a variable data rate channel, then the channel resources may not be as efficiently utilized as possible. For example, in this mismatched case the statistical multiplexing gain (SMG) is less than that compared with a CBR source on a matched CBR channel. Statistical multiplexing gain results when the same communication channel can be used, or multiplexed, between multiple users. For example, when a communication channel is used to transmit voice, the speaker does not usually talk continuously. That is, there will be a "talk" spurt from the speaker followed by silence (listening). If the ratio of time for the "talk" spurt to the silence was, for example 1:1, then on average the same communication channel could be multiplexed and could support two users. But in the case where the data source has a constant data rate and is delivered over a variable rate channel, there is no SMG because there is no time when the communication channel can be used by another user. That is, there is no break during "silence" for a CBR source.

The last case noted in Table 1 above, is the situation when the source of multimedia data is a variable bit rate stream, such as a multimedia data stream like video, and it is transmitted over a communication channel that has a constant bit rate, such as a wireless radio channel with a constant bit rate assignment. In this case, delay is typically introduced between the source and the communication channel, creating "spurts" of data so that the communication channel can be efficiently utilized. In other words, the variable rate data stream is stored in a buffer and delayed long enough so that the output of the buffer can be emptied at a constant data rate, to match the channel fixed data rate. The buffer needs to store, or delay, enough data so that it is able to maintain a constant output without "emptying" the buffer so the CBR communication channel is fully utilized sand the communication channel's resources are not wasted.

The encoder periodically generates video frames according to the video frame period. Video frames consist of data packets, and the total amount of data in a video frame is variable. The video decoder must render the video frames at the same video frame rate used by the encoder in order to ensure an acceptable result for the viewer. The transmission of video frames, which have a variable amount of data, at a constant video frame rate and over a constant rate communication channel can result in inefficiency. For example, if the total amount of data in a video frame is too large to be transmitted within the video frame period at the bit rate of the channel, then the decoder may not receive the entire frame in time to render it according to the video frame rate. In practice, a traffic shaping buffer is used to smooth such large variations for delivery over a constant rate channel. This introduces a delay in rendering the video, if a constant video frame rate is to be maintained by the decoder.

Another problem is that if data from multiple video frames is contained in a single physical layer packet, then the loss of a single physical layer packet results in degradation of multiple video frames. Even for the situations when the data packets are close to the physical layer packet sizes, the loss of one physical layer packet can result in the degradation of multiple video frames.

There is therefore a need in the art for techniques and apparatus that can improve the transmission of variable data rate multimedia data over a wireless communication channel.

SUMMARY

Embodiments disclosed herein address the above stated needs to improve the transmission of information over a wireless communication channel. These techniques include determining a number of transmissions in a wireless communication system that occur during an interval, or period, of an information unit. The information unit is partitioned into portions, or slices, wherein the number of slices is equal to, or less than, the number of transmissions during the information unit internal. Another aspect is determining available communication channels for transmitting information and determining possible physical layer packet sizes of the available channels. An information unit is partitioned into portions, or slices, wherein the size of the portions are selected so as not to exceed one of the physical layer packet sizes of the available communication channels. The techniques can be used for various types of information, such as multimedia data, variable bit rate data streams, video data, or audio data. The techniques can also be used with various over the air interfaces, such as, Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

Another aspect includes techniques for transmitting multimedia data over a wireless communication system are described. These techniques include determining available communication channels for transmitting multimedia data and determining possible data packet sizes of the available channels. A frame of multimedia data is partitioned into portions called "slices", wherein the size of a slice is selected so as to match one of the data packet sizes of the available communication channels. The phrase "multimedia frame", for video, is used herein to mean video frame that can be displayed/rendered on a display device, after decoding. A video frame can be further divided in to independently decodable units. In video parlance, these are called "slices". In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

Another aspect includes determining a number of channel transmissions that occur during the information unit interval, then partitioning the information unit into a number of portions, or slices, that correspond to the number of transmissions during the information unit interval and assigning each slice to a corresponding transmission. For example, if the communication system is a time slot communication system wherein a data transmission is divided into physical layer packets that are transmitted at given intervals, or time slots, then the number of time slots corresponding to an information unit interval, is determined. The information unit is then partitioned into a number of slices equal to the number of time slots that occur during the information unit interval. The slices are then assigned to physical layer packets that are transmitted during the corresponding time slots. Another aspect is that the information unit partitions, or slices, are sized so that they match the physical layer packet size that is transmitted during a time slot.

Yet another aspect is that the time slots that are allocated to multiple information units can be shared among the respective units. For example, time slots that occur during two successive information unit intervals can be shared between these two information units. That is, if one of the information units includes more data than the other, then time slots that would normally be allocated to the smaller information unit can be assigned to the larger information unit. In this manner, the average rate of the information units may be maintained while individual information units may use additional time slots for the transmission of the information, thereby increasing the peak rate (or maximum size of a given information unit). Such an approach is beneficial in improving the visual quality by allowing I frames to be larger than P frames.

The techniques can also be used with various over the air interfaces. For example, the techniques can be used with Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

The techniques can be used for various types of information. Examples of the types of information that the techniques can be used with include variable bit rate data streams, multimedia data. video data, or audio data.

Other features and advantages of the present invention should be apparent from the following description of exemplary embodiments, which illustrate, by way of example, aspects of the invention.

DETAILED DESCRIPTION

Figure 1:
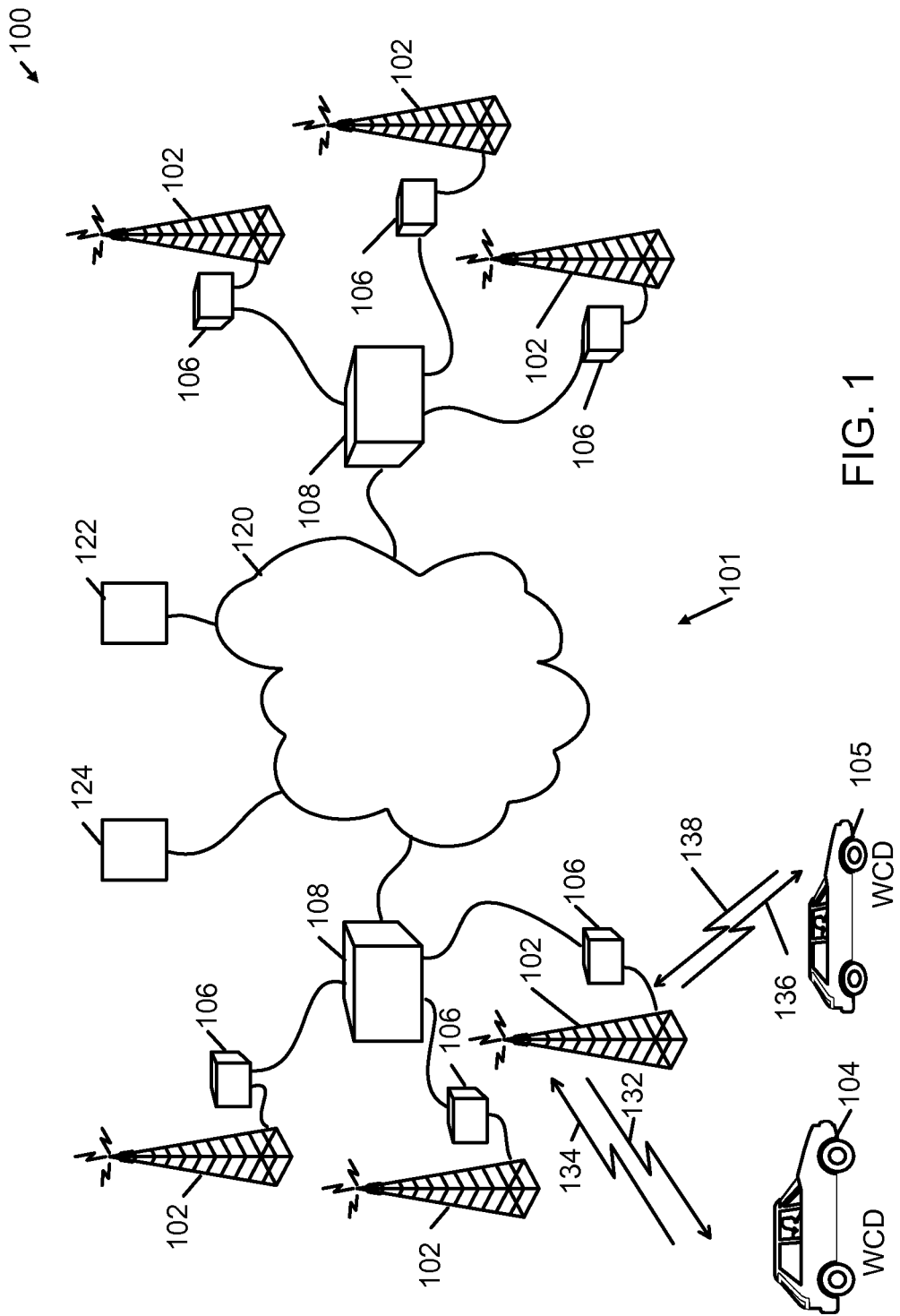
FIG. 1 is an illustration of portions of a communication system 100 constructed in accordance with the present invention.

The word "exemplary" is used herein to mean "serving as an example, instance, or illustration." Any embodiment described herein as "exemplary" is not necessarily to be construed as preferred or advantageous over other embodiments.

The word "streaming" is used herein to mean real time delivery of multimedia data of continuous in nature, such as, audio, speech or video information, over dedicated and shared channels in conversational, unicast and broadcast applications. The phrase "multimedia frame", for video, is used herein to mean video frame that can be displayed/rendered on a display device, after decoding. A video frame can be further divided in to independently decodable units. In video parlance, these are called "slices". In the case of audio and speech, the term "multimedia frame" is used herein to mean information in a time window over which speech or audio is compressed for transport and decoding at the receiver. The phrase "information unit interval" is used herein to represent the time duration of the multimedia frame described above. For example, in case of video, information unit interval is 100 milliseconds in the case of 10 frames per second video. Further, as an example, in the case of speech, the information unit interval is typically 20 milliseconds in cdma2000, GSM and WCDMA. From this description, it should be evident that, typically audio/speech frames are not further divided in to independently decodable units and typically video frames are further divided in to slices that are independently decodable. It should be evident form the context when the phrases "multimedia frame", "information unit interval", etc. refer to multimedia data of video, audio and speech.

Techniques are described to improve the transmission of information over a wireless communication channel. These techniques include determining a number of transmissions in a wireless communication system that occur during an information unit interval. The data in the information unit is partitioned into slices, wherein the number of slices is equal to, or less than, the number of transmissions during the information unit internal. Another aspect is determining available communication channels for transmitting information and determining possible physical layer packet sizes of the available channels. An information unit is partitioned into slices, wherein the size of the slices are selected so as not to exceed one of the physical layer packet sizes of the available communication channels. The techniques can be used for various types of information, such as multimedia data, variable bit rate data streams, video data, or audio data. The techniques can also be used with various over the air interfaces, such as, Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

In one embodiment, the techniques are used for transmitting multimedia data over a wireless communication system. These techniques include determining available communication channels for transmitting multimedia data and determining possible data packet sizes of the available channels. A frame of multimedia data is partitioned into portions called "slices", wherein the size of a slice is selected so as not to exceed one of the data packet sizes of the available communication channels. By selecting the size of a slice so that it does not exceed the size of an available communication channel the size of the slice is "matched" to the size of the channel.

Techniques described include determining a number of channel transmissions that occur during the an information unit interval, or period, then partitioning the information unit into a number of portions, or slices, that correspond to the number of transmissions during the information unit interval and assigning each slice to a corresponding transmission. For example, if the communication system is a time slot communication system wherein a data transmission is divided into physical layer packets that are transmitted at given intervals, or time slots, then the number of time slots corresponding to an information unit interval, or period, is determined. The information unit is then partitioned into a number of slices equal to the number of time slots that occur during the information unit interval. The slices are then assigned to physical layer packets that are transmitted during the corresponding time slots. Another aspect is that the information unit partitions, or slices, are sized so that they match the physical layer packet size that is transmitted during a time slot.

The time slots that are allocated to multiple information units can be shared among the respective units. For example, time slots that occur during two successive information unit intervals can be shared between these two information units. That is, if one of the information units includes more data than the other, then time slots that would normally be allocated to the smaller information unit can be assigned to the larger information unit. In this manner, the average rate of the information units may be maintained while individual information units may use additional time slots for the transmission of the information, thereby increasing the peak rate (or maximum size of a given information unit). Such an approach is beneficial in improving the visual quality by allowing I frames to be larger than P frames.

In general, an information source has variable entropy, that is, it produces information units that include differing amounts of data. The information source may produce the information units at a constant, or predetermined, rate. In addition, information units may be referred to as frames.

Examples of protocols and formats for transmitting information, such as, variable bit rate data, multimedia data, video data, speech data, or audio data, from a content server or source on the wired network to a mobile are also provided. The techniques described are applicable to any type of multimedia applications, such as unicast streaming, conversational and broadcast streaming applications. For example, the techniques can be used to transmit multimedia data, such as video data (such as a content server on wireline streaming to a wireless mobile), as well as other multimedia applications such as broadcast/multicast services, or audio and conversational services such as video telephony between two mobiles, FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations (MS) or mobiles. In general, WCDs may be either mobile or fixed. The landline communication devices 122 and 124 can include, for example, serving nodes, or content servers, that provide various types of multimedia data such as streaming data. In addition, MSs can transmit streaming data, such as multimedia data.

The infrastructure 101 may also include other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, IP networks, or the public switched telephone network (PSTN).

The term "forward link" or "downlink" refers to the signal path from the infrastructure 101 to a MS, and the term "reverse link" or "uplink" refers to the signal path from a MS to the infrastructure. As shown in FIG. 1, MSs 104 and 105 receive signals 132 and 136 on the forward link and transmit signals 134 and 138 on the reverse link. In general, signals transmitted from a MS 104 and 105 are intended for reception at another communication device, such as another remote unit, or a landline communication device 122 and 124, and are routed through the IP network or switching network 120. For example, if the signal 134 transmitted from an initiating WCD 104 is intended to be received by a destination MS 105, the signal is routed through the infrastructure 101 and a signal 136 is transmitted on the forward link to the destination MS 105. Likewise, signals initiated in the infrastructure 101 may be broadcast to a MS 105. For example, a content provider may send multimedia data, such as streaming multimedia data, to a MS 105. Typically, a communication device, such as a MS or a landline communication device, may be both an initiator of and a destination for the signals.

Examples of a MS 104 include cellular telephones, wireless communication enabled personal computers, and personal digital assistants (PDA), and other wireless devices. The communication system 100 may be designed to support one or more wireless standards. For example, the standards may include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), IS2000, HRPD, cdma2000, Wideband CDMA (WCDMA), and others.

Figure 2:
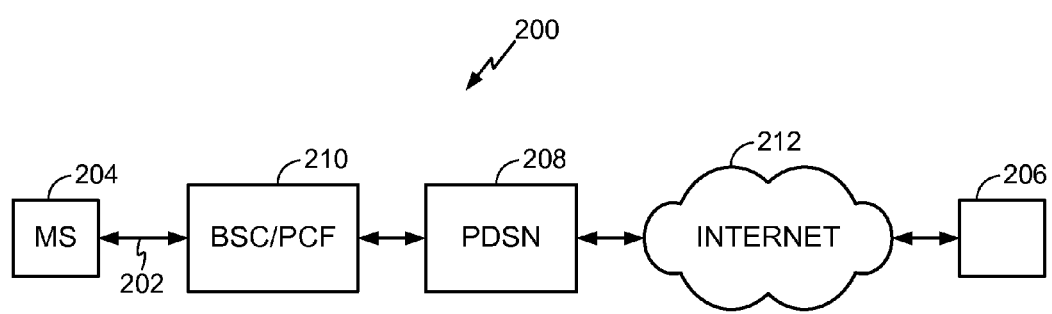
FIG. 2 is a block diagram illustrating an exemplary packet data network and various air interface options for delivering packet data over a wireless network in the FIG. 1 system.

FIG. 2 is a block diagram illustrating an exemplary packet data network and various air interface options for delivering packet data over a wireless network. The techniques described may be implemented in a packet switched data network 200 such as the one illustrated in FIG. 2. As shown in the example of FIG. 2, the packet switched data network system may include a wireless channel 202, a plurality of recipient nodes or MS 204, a sending node or content server 206, a serving node 208, and a controller 210. The sending node 206 may be coupled to the serving node 208 via a network 212 such as the Internet.

The serving node 208 may comprise, for example, a packet data serving node (PDSN) or a Serving GPRS Support Node (SGSN) and a Gateway GPRS Support Node (GGSN). The serving node 208 may receive packet data from the sending node 206, and serve the packets of information to the controller 210. The controller 210 may comprise, for example, a Base Station Controller/Packet Control Function (BSC/PCF) or Radio Network Controller (RNC). In one embodiment, the controller 210 communicates with the serving node 208 over a Radio Access Network (RAN). The controller 210 communicates with the serving node 208 and transmits the packets of information over the wireless channel 202 to at least one of the recipient nodes 204, such as an MS.

In one embodiment, the serving node 208 or the sending node 206, or both, may also include an encoder for encoding a data stream, or a decoder for decoding a data stream, or both. For example the encoder could encode a video stream and thereby produce variable-sized frames of data, and the decoder could receive variable sized frames of data and decode them. Because the frames are of various size, but the video frame rate is constant, a variable bit rate stream of data is produced. Likewise, a MS may include an encoder for encoding a data stream, or a decoder for decoding a received data stream, or both. The term "codec" is used to describe the combination of an encoder and a decoder.

In one example illustrated in FIG. 2, data, such as multimedia data, from the sending node 206 which is connected to the network, or Internet 212 can be sent to a recipient node, or MS 204, via the serving node, or Packet Data Serving Node (PDSN) 206, and a Controller, or Base Station Controller/Packet Control Function (BSC/PCF) 208. The wireless channel 202 interface between the MS 204 and the BSC/PCF 210 is an air interface and, typically, can use many channels for signaling and bearer, or payload, data.

Air Interface

The air interface 202 may operate in accordance with any of a number of wireless standards. For example, the standards may include standards based on TDMA or FDMA, such as Global System for Mobile Communication (GSM), General Packet Radio Service (GPRS), Enhanced Data GSM Environment (EDGE), or standards based on CDMA such as TIA/EIA-95-B (IS-95), TIA/EIA-98-C (IS-98), IS2000, HRPD, cdma2000, Wideband CDMA (WCDMA), and others.

In a system based on cdma2000, data can be transmitted on multiple channels, for example, on a fundamental channel (FCH), generally used to transmit voice, a dedicated control channel (DCCH), a supplemental channel (SCH), and a packet data channel (PDCH) as well as other channels.

The FCH provides a communication channel for the transmission of speech at multiple fixed rates, e.g. full rate, half rate, quarter rate and $1/8^{th}$ rate. The FCH provides these rates and when a user's speech activity requires less than the full rate to achieve a target voice quality, the system reduces interference to other users in the system by using one of the lower data rates. The benefit of lowering source rate in order to increase the system capacity is well known in CDMA networks.

DCCH is similar to FCH but provides only full rate traffic at one of two fixed rates, 9.6 kbps in radio configuration three (RC3), and 14.4 in radio configuration five (RC5). This is called 1× traffic rate. SCH can be configured to provide traffic rates at 1×, 2×, 4×, 8× and 16× in cdma2000. When there is no data to be transmitted, both DCCH and SCH can cease transmission, that is not transmit any data, also referred to as dtx, to ensure reduced interference to the other users in the system or to stay within the transmit power budget of the base station transmitter. The PDCH can be configured to transmit data packets that are n*45 bytes, where n={1, 2, 4, 8}.

The FCH and DCCH channels provide a constant delay and low data packet loss for communication of data, for example, to enable conversational services. The SCH and PDCH channels provide multiple fixed bit rate channels providing higher bandwidths, for example, 300 kbps to 3 Mbps, than the FCH and DCCH. The SCH and PDCH also have variable delays because these channels are shared among many users. In the case of SCH, multiple users are multiplexed in time, which introduces different amounts of delay depending on the system load. In the case of PDCH, the bandwidth and delay depend on, for example, the radio conditions, negotiated Quality of Service (QoS), and other scheduling considerations. Similar channels are available in systems based on TIA/EIA-95-B (IS-95), TLI/EIA-98-C (IS-98), IS2000, HRPD, UTS, and Wideband CDMA (WCDMA).

It is noted that FCH provides multiple fixed bit data rates (full, half, quarter and $1/8$) to conserve power required by a voice user. Typically, a voice encoder, or vocoder will use a lower data rate when the time-frequency structure of a signal to be transmitted permits higher compression without unduly compromising the quality. This technique is commonly referred to as source controlled variable bit rate vocoding. Thus, in a system based on TIA/EIA-95-B (IS-95), TIA/EIA-98-C (IS-98), IS2000, HRPD, UMTS, cdma2000, or Wideband CDMA (WCDMA) there are multiple fixed bit rate channels available for transmitting data.

In a system based on CDMA, such as cdma2000, the communication channels are divided into a continuous stream of "slots." For example, the communication channels may be divided into 20 ms segments or time slots. This is also called "Transmit Time Interval" (TTI). Data transmitted during these time slots is assembled into packets, where the size of the data packet depends on the available data rate, or bandwidth, of the channel. Thus, during any individual time slot it is possible that there are individual data packets being transmitted over their respective communication channel. For example, during a single time slot, a data packet may be transmitted on the DCCH channel and a different data packet may simultaneously be transmitted on the SCH channel.

Figure 3:
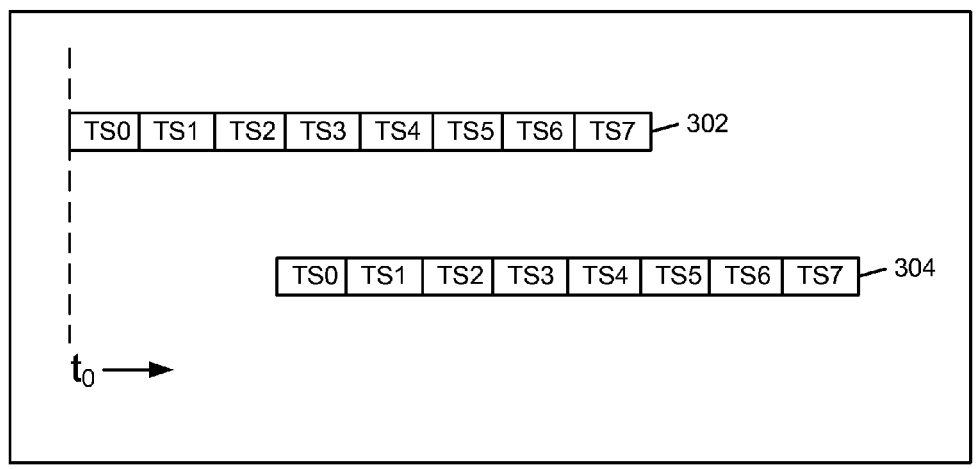
FIG. 3 is a block diagram illustrating two radio frames 302 and 304 in the FIG. 1 system utilizing the GSM air interface.

Likewise, in a system based on GSM, or GPRS, or EDGE, data can be transmitted between the BSC 208 and MS 204 using multiple time slots within a frame. FIG. 3 is a block diagram illustrating two radio frames 302 and 304 in the GSM air interface. As shown in FIG. 3, the GSM air interface radio frames 302 and 304 are each divided into eight timeslots. Individual timeslots are assigned to particular users in the system. In addition, GSM transmission and reception use two different frequencies and forward link and reverse link are offset by three timeslots. For example, in FIG. 3 a downlink radio frame 302 begins at time $t_0$ and would be transmitted at one frequency, and an uplink radio frame 304 begins at a later time and would be transmitted at a different frequency. The downlink radio frame 302 is offset by three time slots, TS0-TS2, from the uplink radio frame. Having an offset between the downlink and uplink radio frames allows wireless communication devices, or terminals, to be able to operate without having to be able to transmit and receive at the same time.

Advancements in GSM wireless communication devices, or terminals, have resulted in GSM terminals that can receive multiple timeslots during the same radio frames. These are called "multislot classes" and can be found in Annex B of 3GPP TS 45.002, incorporated herein in its entirety. Thus, in a system based on GSM, or GPRS, or EDGE there are multiple fixed time slots available for transmitting data.

Packet Data Network Model

Figure 4:
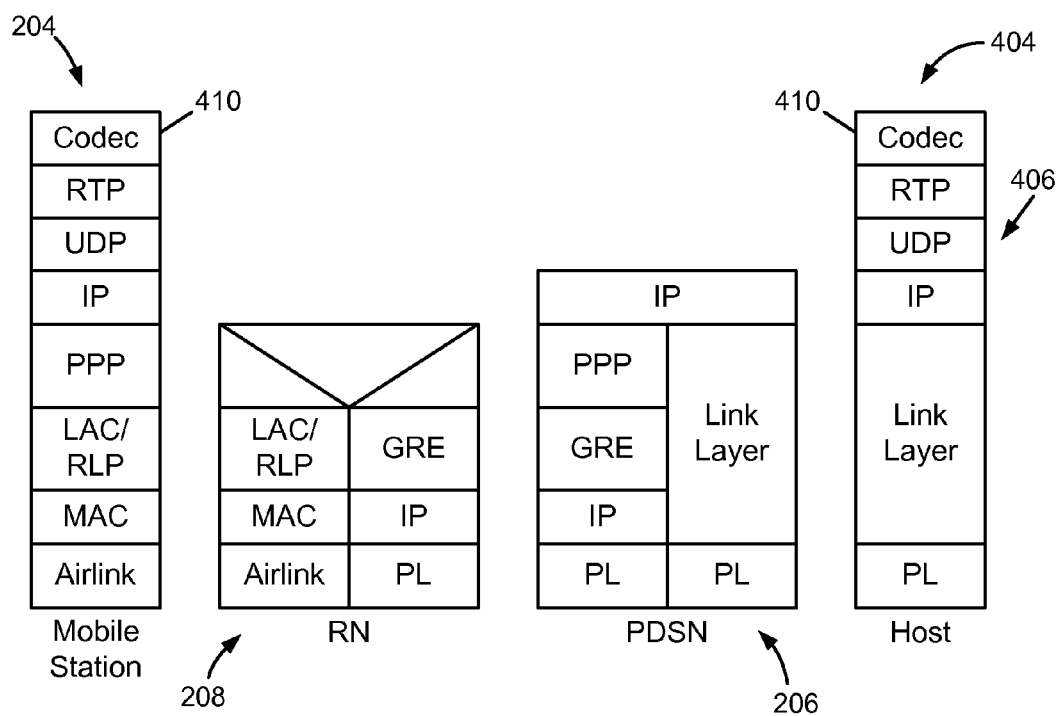
FIG. 4 is a diagram illustrating protocol stack for packet data in a wireless communication system.

FIG. 4 is a diagram illustrating protocol stack for packet data in a wireless communication system. Application data from a encoder/decoder (codec) 402 in a host 404 is encapsulated in the RTP/UDP/IP/PPP layers 406 for IP transmission, in accordance with traditional OSI layering conventions. The data passes through OSI layers of the PDSN 206 and Radio Network (RN) 208, such as a base station controller/packet control function, to the MS 204 where a codec 410 decompresses the data.

Multimedia encoders, for example video encoders, may generate multimedia frames of variable size. For example, in some video compression techniques, such as MPEG-4, each new video frame includes information used to display the next frame of the video sequence. In a system based on this type of technique, video frames may typically be of two types: I or P frames. I frames are self-contained, similar to JPEG files, in that each I frame contains all the information needed to display one complete frame. In contrast, P frames typically include information relative to the previous frame, such as differential information relative to the previous frame, like motion vectors. Therefore, because P frames rely on previous frames, a P frame is not self-contained, that is it cannot be self-decoded. Typical I frames are larger than P frames, for example, about 8 to 10 times larger, depending on the content and encoder settings.

Figure 5:
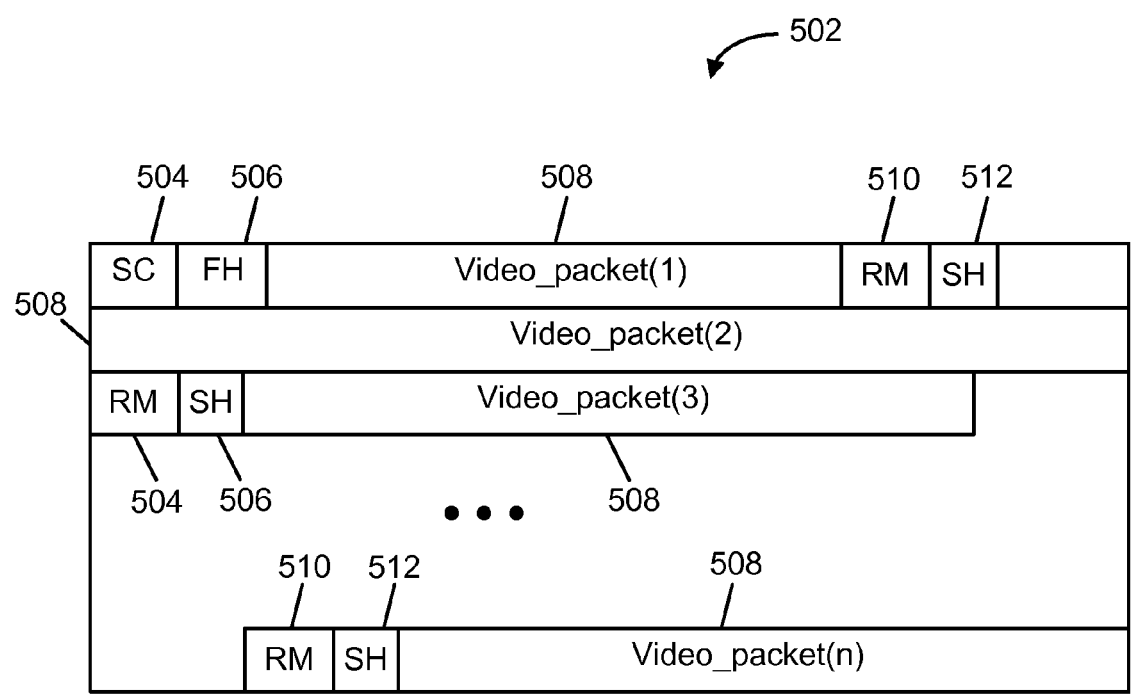
FIG. 5 is a diagram illustrating an encoded video stream of a video frame identifying various portions of the stream using typical syntax.

The following are some typical syntax elements of a video frame. There are subtle differences among different codecs, such as, H.263, H.263+, MPEG-4, and AVC/H.264, but such differences are not of material relevance to the techniques described. FIG. 5 is a diagram illustrating an encoded video stream of a video frame 502 identifying various portions of the stream using typical syntax.

start_code (SC) 504: Each video frame starts with unique pattern, so that start of a video frame can be identified in a bitstream. The term start_code is commonly used to mean a "video frame start code", as there are many types of start codes.

Frame_Header (FH) 506: a sequence of bits that specify interpretation of rest of the payload. Among other things, the header contains timing information (for MPEG-4, these fields are called modulo_time_base and vop_time_increment).

Video_packet/Slice 508: A collection of one or more macroblocks that form an independently decodable region of a video frame.

Resync_marker (RM) 510: A unique sequence of bits that enable a compliant decoder to locate the beginning of a video_packet.

Slice_header (S) 512: A sequence of bits that specify interpretation of the rest of the payload in given slice or video packet. Among other things, slice header contains the address of the first macroblock in a video frame. For example, in a QCIF size frame of 176×144 pixels that is arranged as 11×9 macroblocks of 16×16 pixels, macroblock "11" would be in the second ($2^{nd}$) row and first ($1^{st}$) column.

Video packets, or slices 508, may be variable lengths, or sizes, and are typically encoded using variable length codes (VLC). After transmission, received slices are decoded. If a decoding error occurs for any macroblock in a slice 508, for example, due to channel errors, all the remaining macroblocks in the slice 508 may not be able to be properly decoded. Proper decoding may re-start after locating a resync_marker 510 or start_code 512 in the bitstream. A technique to address this problem is included in MPEG-4 that allows use of reversible VLC (RVLC), wherein after finding the resync_marker or start_code, some macroblocks can be decoded from a previous slice 508 in a stream by decoding the macroblocks in reverse order. RVLC adds coding overhead and complexity, and is not typically used in many applications, such as video, and any quality improvements in the presence of block errors are still being evaluated.

Figure 6:
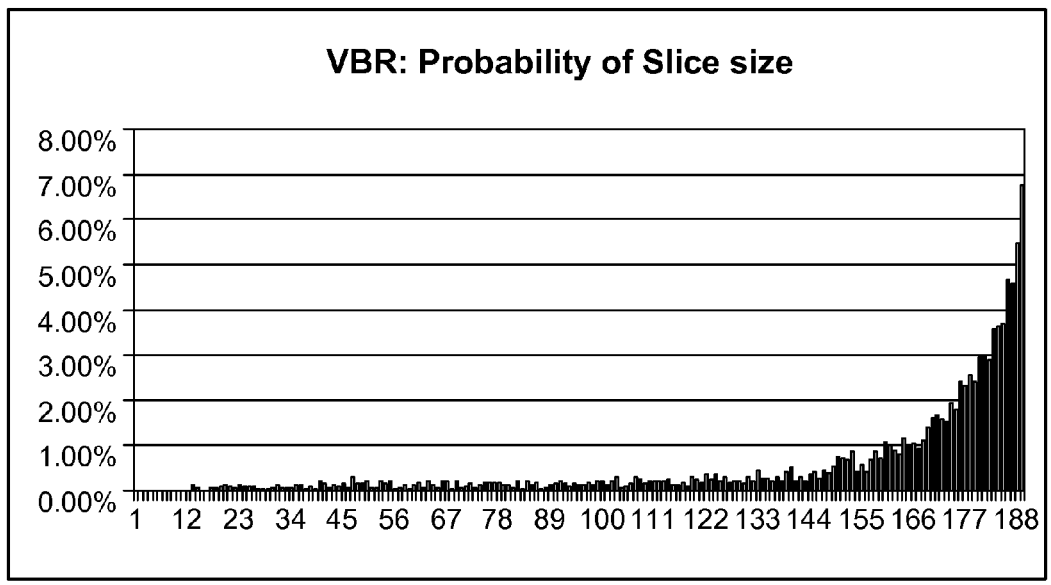
FIG. 6 shows a histogram of slice sizes for a video sequence encoded with AVC/H.264, where the maximum size was constrained, or limited, to 189 bytes.

To overcome some of these problems, in one embodiment each video slice can be independently decoded and the video slice size is selected, and encoded, so that it matches the size of a physical layer data packet. That is, the video slice size is constrained so that the encoded slice contains the same, or less, number of data bits as a physical layer data packet of an available communication channel. As described further below, constraining the encoder so that a slice size matches the physical layer data packet size is advantageous. FIG. 6 shows a histogram of slice sizes for a video sequence encoded with AVC/H.264, where the maximum size was constrained, or limited, to 189 bytes. Note that typically encoders are not constrained to have a predetermined maximum slice size.

VBR Performance Considerations

Variable Bit Rate (VBR) multimedia data, such as video, usually includes common characteristics. For example, video data is generally captured at a constant frame rate by a sensor, such as a camera. A multimedia transmitter generally requires a finite processing time with an upper bound to encode the video stream. A multimedia receiver generally requires a finite processing time with an upper bound to decode the video stream.

It is generally desirable to reconstruct multimedia frames at the same frame rate at which they were produced. For example, in the case of video it is desirable to display the reconstructed video frames at the same rate at which the video was captured at a sensor or camera. Having the reconstruction and capture rate the same makes it easier to synchronize with other multimedia elements, for example, synchronizing a video stream with an accompanying audio, or speech, steam is simplified.

In the case of video, from a human perception point of view, it is usually desirable to maintain a consistent level of quality. It is generally more annoying, and taxing, for a person to process a continuous multimedia stream with fluctuations in quality than to process a multimedia stream of consistent quality. For example, it is usually annoying to a person to process a video stream that includes quality artifacts such as freeze frames and "blockiness."

Figure 7:
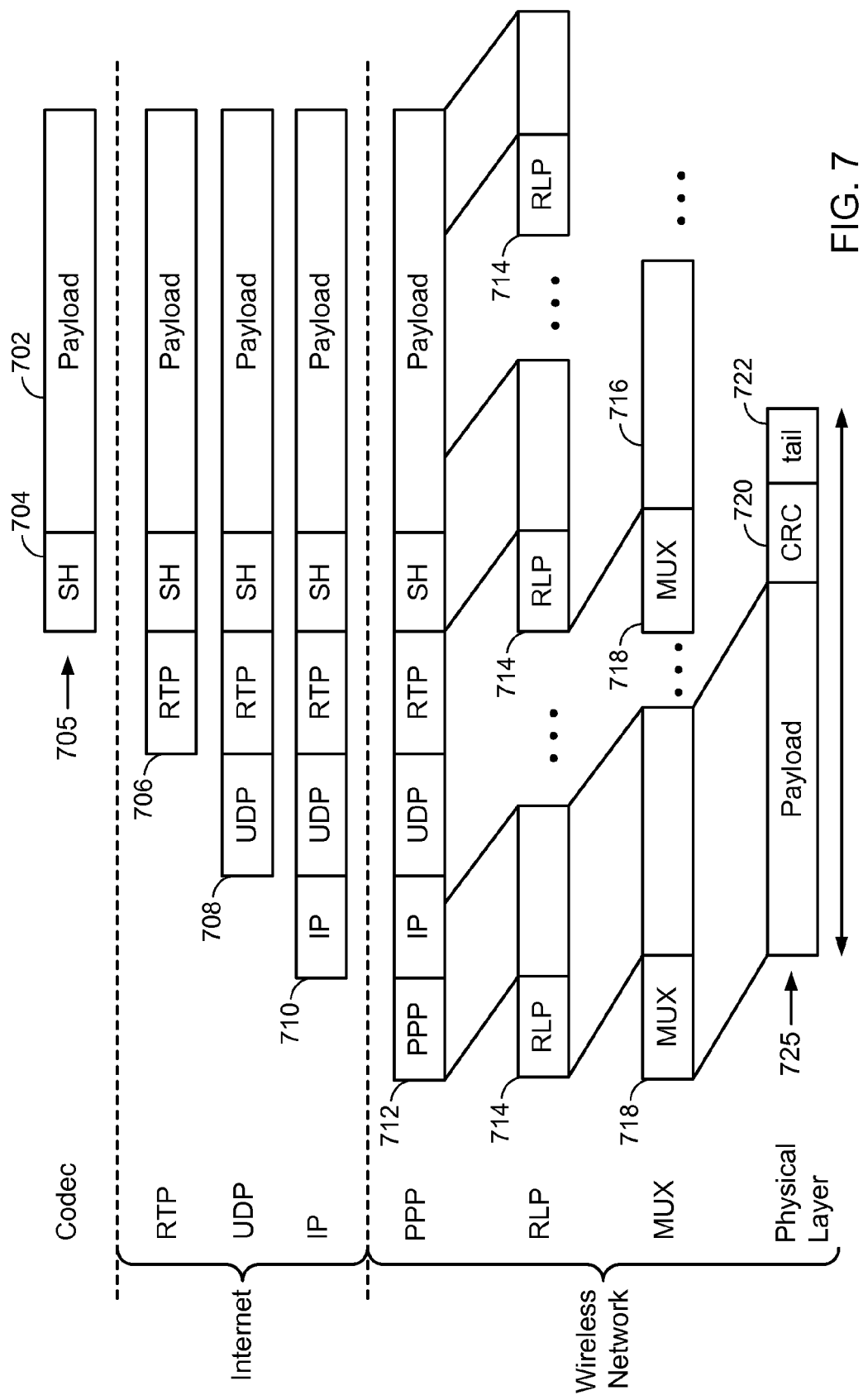
FIG. 7 is a diagram illustrating various levels of encapsulation present when transmitting multimedia data, such as video data, over a wireless links using the RTP/UDP/IP protocol.

FIG. 7 is a diagram illustrating various levels of encapsulation present when transmitting multimedia data, such as video data, over a wireless links using the RTP/UDP/IP protocol. As shown in FIG. 7, a video codec generates a payload, 702 that includes information describing a video frame. The payload 702 may be made up of several video packets (not depicted). The payload 702 is pre-pended by a Slice_Header (SH) 704. Thus, an application layer data packet 705 includes the payload 702 and the associated Slice_Header 704. As the payload passes through a network, such as the Internet, additional header information may be added. For example, a real-time protocol (RTP) header 706, a user datagram protocol (UDP) header 708, and an Internet protocol (IP) header 710 may be added. These headers provide information used to route the payload from its source to its destination.

Upon entering the wireless network, a point to point protocol (PPP) header 712 is added to provide framing information for serializing the packets into a continuous stream of bits. A radio link protocol, for example, RLP in cdma2000 or RLC in W-CDMA, then packs the stream of bits into RLP packets 714. The radio-link protocol allows, among other things, the re-transmission and re-ordering of packets sent over the air interface. Finally, the air interface MAC-layer takes one or more RLP packets 714, packs them into MUX layer packet 716, and adds a multiplexing header (MUX) 718. A physical layer packet channel coder then adds a checksum (CRC) 720 to detect decoding errors, and a tail part 722 forming a physical layer packet 725.

The successive uncoordinated encapsulations illustrated in FIG. 7, has several consequences on the transmission of multimedia data. One such consequence is that there may be a mismatch between application layer data packets 705 and physical layer packets 725. As a result of this mismatch, each time a physical layer packet 725 containing portions of one or more application layer packets 705 is lost, the corresponding entire application layer 705 is lost. Because portions of a single application layer data packet 705 may be included in more than one physical layer data packet 725, losing one physical layer packet 725 can result in the loss of an entire application layer packet 705 because the entire application layer data packet 705 is needed to be properly decoded. Another consequence is that if portions of more than one application layer data packets 705 is included in a physical layer data packet 725, then the loss of a single physical layer data packet 725 can result in the loss of more than one application layer data packets 705.

Figure 8:
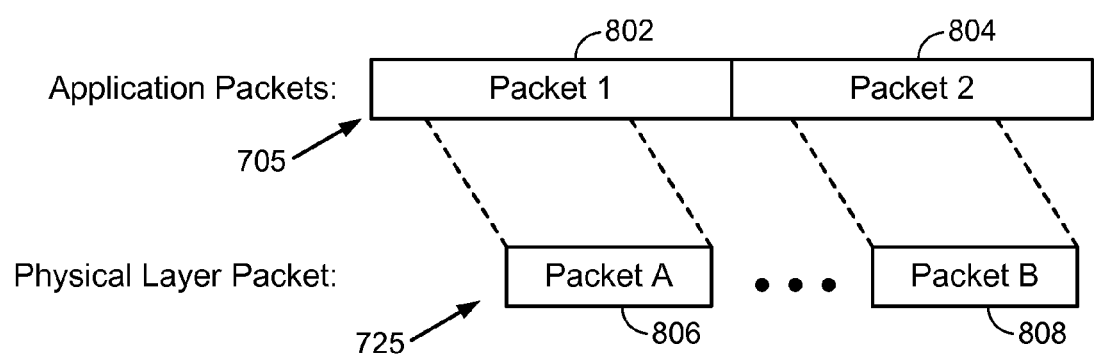
FIG. 8 is a diagram illustrating an example of the allocation of application data packets, such as multimedia data packets, into physical layer data packets

FIG. 8 is a diagram illustrating an example of conventional allocation of application data packets 705 such as multimedia data packets, into physical layer data packets 725. Shown in FIG. 8, are two application data packets 802 and 804. The application data packets can be multimedia data packets, for example each data packet 802 and 804 can represent a video frame. The uncoordinated encapsulations illustrated in FIG. 8 can result in a physical layer packet having data that is from a single application data packet or from more than one application data packet. As shown in FIG. 8, a first physical layer data packet 806 can include data from a single application layer packet 802, while a second physical layer data packet 808 can include data from more that one application data packet 802 and 804. In this example, if the first physical layer data packet 806 is "lost", or corrupted during transmission, then a single application layer data packet 802 is lost. On the other hand if the second physical layer packet 808 is lost, then two application data packets 802 and 804 are also lost.

Explicit Bit Rate Control

Use of a technique referred to as explicit bit rate control (EBR), rather that CBR or VBR, can improve the transmission of information units over a CBR channel. In EBR information units, such as a video stream, are partitioned so that application layer data packets of the information units match the physical layer data packets of a communication channel that the data is going to be transported over. For example, in EBR, an encoder may be constrained, or configured, so that each application layer data packet that it outputs is a desired size and is independently decodable.

Examples of the EBR techniques are described as implemented on a communication system based on CDMA, for example, a communication system based on cdma2000. A communication system based on cdma2000 includes multiple channels to transmit data, three examples are a dedicated control channel (DCCH), a supplemental channel (SCH), and a packet data channel (PDCH). The DCCH is an on/off, low-rate, channel that is dedicated to a single user. The SCH is a variable, high-rate, scheduled channel that may be shared among multiple users. Note that the SCH is called "variable" rate but it is not a true "variable-rate" channel, instead it has multiple fixed rates that can be selected. The PDCH is a variable, high-rate channel that is shared among multiple users. Following is an example of EBR using DCCH and SCH, and another example of EBR using PDCH.

EBR Using DCCH and V-SCH

Figure 9:
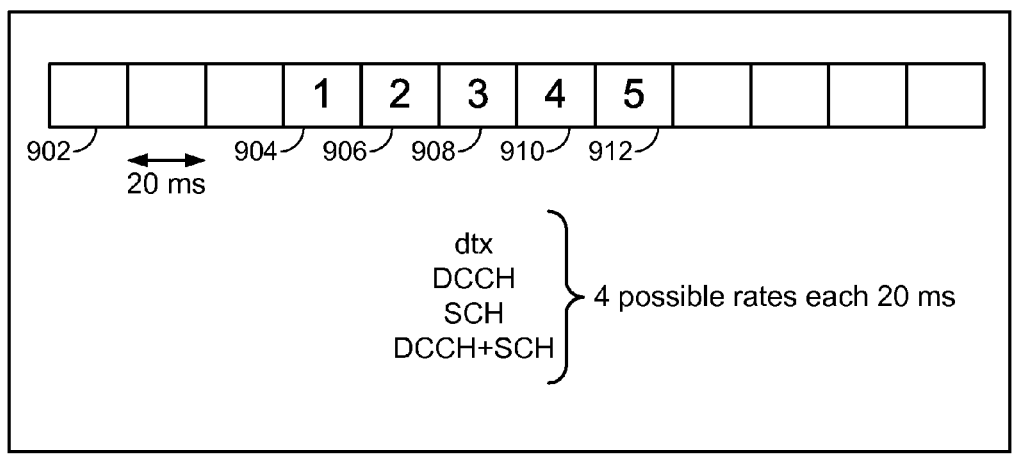
FIG. 9 illustrates the time-slot characteristic of a system based on cdma2000, when multiple CBR channels are used to create a pseudo-VBR channel.

In one embodiment of EBR, the DCCH and SCH channels are utilized to transmit multimedia data. FIG. 9 illustrates some characteristics of a time-slot communication system based on cdma2000. In a system based on cdma2000, data is transmitted in time slots 902, for example, in 20 ms time slots. Advantage may be taken of the time slot nature of the communication channel when transmitting multimedia data. For example, if a multimedia data stream, such as a video data stream, is being transmitted at a 10 frames per second (fps) rate, then an entire frame of data needs to be transmitted within 100 ms. Thus, five 20 ms time slots 904, 906, 908, 910, and 912 can be used to transmit a single frame of video data. As noted, in a system based on cdma2000, there are multiple channels available for transmitting data during each time slot. In one example illustrated in FIG. 9, within each individual time slot there are two possible channels, with various physical layer packet sizes, that can be used to transmit data, the DCCH and the SCH. In addition, data can be transmitted using a combination of the DCCH and SCH channels, or no data can be transmitted, referred to as "dtx." Thus, there are four possible physical layer packet sizes that can be used to transmit data within each time slot, resulting in different data rates.

In one embodiment, a multimedia data frame is divided into "slices" that include at least one macroblock. For example, a video frame may be partitioned into macroblocks that are 16 pixels by 16 pixels. The macroblocks may then be grouped into slices. The size of the slices may be constrained so that they match the physical layer packet size of the available communication channels. That is, the application layer frame is partitioned so that no slice will occupy more that one physical layer packet size of an available communication channel.

For example, as noted above, in a system based on MPEG-4 compression techniques, video frames may typically be of two types: I or P frames. In general, each frame of data can be partitioned into slices, such that each slice can be independently decoded. That is, each slice can be decoded without needing other information. Each encoded slice is also configured so that the size of the encoded slice matches an available size of a communication channel physical layer data packet. Also, if additional header information needs to be added to the multimedia data when it is encoded, the size of the header is taken into account when selecting slice sizes. For example, if the encoder is encoding video information then, as illustrated in FIGS. 5 and 7, each slice may include a slice header that is part of the application layer data packet. Thus, the size of the slice, including any headers, is configured such that the size of each encoded video slice matches an available size of a physical layer packet. In other words, frame slice sizes are matched to physical layer packet sizes.

Because each slice of a frame is independently decodable, then the loss of a slice of a frame will not prevent the decoding of the other slices of the frame. For example, if a video frame is divided into five slices, such that each slice is independently decodable and matched to a physical layer data packet, then corruption, or loss, of one of the physical layer data packets will result in the loss of only the corresponding slice and the slices that are successfully transmitted can be successfully decoded. Thus, although the entire video frame may not be decoded, portions of it may be. In this example, four of the five video slices will be successfully decoded, and thereby allow the video frame to be rendered, or displayed, albeit at reduced performance.

For example, if a 10 fps video data stream is communicated from a sending node to a MS, in a system based on cdma2000, then each video frame can be partitioned into five slices. The number of slices that a frame can be divided into corresponds to the number of time slots that correspond to the frame rate. In other words, for a 10 fps rate, the frame period is 100 msec. With a time slot period of 20 msec, there are five time slots transmitted during each frame period. By matching the number of slices that a frame is partitioned into, and constraining each slice size so that it matches one of the available physical layer packet sizes of an available communication channel, streaming data can be efficiently transmitted over a set of CBR channels that act like VBR communication channel in combination.

An example of a system based on cdma2000 using the DCCH and SCH channels is described. As noted above, the DCCH channel can be configured to support multiple, fixed, data rates. For example, the DCCH can support data transmission rates of either 9.60 kbps or 14.4 kbps depending on the selected rate set (RS), RS1 and RS2 respectively. The SCH channel can also be configured to support multiple, fixed data rates, depending on the SCH radio configuration (RC). The SCH supports multiples of 9.6 kps when configured in RC3 and multiples of 14.4 kps when configured as RC5. The SCH data rates are:

$$SCH_{DATA\_RATE} = (n * RC \text{ data rate}) \quad \text{Eq. 1}$$

where n=1, 2, 4, 8, or 16 depending on the channel configuration.

Table 2, below, illustrates possible physical layer data packet sizes for the DCCH and SCH channels in a communication system based on cdma2000. The first column identifies a case, or possible configuration. The second and third columns are the DCCH rate set and SCH radio configuration respectively. The fourth column has three entries. The first is the physical layer data packet size of a 20 ms time slot for the DCCH channel. The second entry is the physical layer data packet size of a 20 ms time slot for the SCH channel. The third entry is the physical layer data packet size of a 20 ms time slot for a combination of the DCCH and SCH channels.

TABLE 2

Possible Physical Layer Packet Sizes for Combinations of DCCH and SCH

| Case | DCCH Config-uration | SCH Config-uration | Physical Layer Packet Sizes (bytes) | | | |
|---|---|---|---|---|---|---|
| | | | dtx, | DCCH | SCH | DCCH + SCH |
| 1 | RS1 | 2× in RC3 | 0, | 20, | 40, | 60 |
| 2 | RS1 | 4× in RC3 | 0, | 20, | 80, | 100 |
| 3 | RS1 | 8× in RC3 | 0, | 20, | 160, | 180 |
| 4 | RS1 | 16× in RC3 | 0, | 20 | 320 | 340 |
| 5 | RS2 | 2× in RC3 | 0, | 31, | 40, | 71 |
| 6 | RS2 | 4× in RC3 | 0, | 31, | 80, | 111 |
| 7 | RS2 | 8× in RC3 | 0, | 31, | 160, | 191 |
| 8 | RS2 | 16× in RC3 | 0, | 31, | 320 | 351 |
| 9 | RS1 | 2× in RC5 | 0, | 20, | 64, | 84 |
| 10 | RS1 | 4× in RC5 | 0, | 20, | 128, | 148 |
| 11 | RS1 | 8× in RC5 | 0, | 20, | 256, | 276 |
| 12 | RS1 | 16× in RC5 | 0, | 20, | 512 | 532 |
| 13 | RS2 | 2× in RC5 | 0, | 31, | 64, | 95 |
| 14 | RS2 | 4× in RC5 | 0, | 31, | 128, | 159 |
| 15 | RS2 | 8× in RC5 | 0, | 31, | 256, | 287 |
| 16 | RS2 | 16× in RC5 | 0, | 31, | 512 | 543 |

It should be noted that there is a tradeoff to be considered when an application layer data packet is too large to fit into the DCCH or SCH physical layer data packets and instead a combined DCCH plus SCH packet is going to be used. A tradeoff in deciding to encode an application layer data packet so that it is sized to fit into a combined DCCH plus SCH data packet size, versus making two packets, is that a larger application layer packet, or slice, generally produces better compression efficiency, while smaller slices generally produce better error resiliency. For example, a larger slice generally requires less overhead. Referring to FIG. 7, each slice 702 has its own slice header 704. Thus, if two slices are used instead of one, there are two slice headers added to the payload, resulting in more data needed to encode the packet and thereby reducing compression efficiency. On the other hand, if two slices are used, one transmitted on the DCCH and the other transmitted on the SCH, then corruption, or loss, of only one of either the DCCH or SCH data packets would still allow recovery of the other data packet, thereby improving error resiliency.

To help in understanding Table 2 the derivation of Case 1 and 9 will be explained in detail. In Case 1 DCCH is configured as RS1 corresponding to a data rate of 9.6 Kbps. Because the channels are divided into 20 ms time slots, within an individual time slot the amount of data, or physical layer packet size, that can be transmitted on DCCH configured RS1 is:

$$9600 \text{ bits/sec} * 20 \text{ msec} = 192 \text{ bits} = 24 \text{ bytes} \quad \text{Eq. 7}$$

Because of additional overhead that is added to physical layer packet, for example, RLP for error correction, only 20 bytes are available for the application layer data packet, which includes the slice and the slice header. Thus, the first entry in the fourth column of Table 2, for Case 1 is 20.

The SCH for Case 1 is configured as 2× in RC3. RC3 corresponds to a base data rate of 9.6 Kbps and the 2× means that the channel data rate is two times the base data rate. Thus, within an individual time slot the amount of data, or physical layer packet size, that can be transmitted on SCH configured 2×RC3 is:

$$2 * 9600 \text{ bits/sec} * 20 \text{ msec} = 384 \text{ bits} = 48 \text{ bytes} \quad \text{Eq. 8}$$

Here, because of additional overhead that is added to the physical layer packet, only 40 bytes are available for the application layer data packet, which includes the slice and the slice header. Thus, the second entry in the fourth column of Table 2, for Case 1 is 40. The third entry in the fourth column of Table 2 for Case 1 is the sum of the first and second entries, or 60.

Case 9 is similar to Case 1. In both cases the DCCH is configured as RS1, corresponding to a physical layer packet size of 20 bytes. The SCH channel in Case 9 is configured as 2×RC5. RC5 corresponds to a base data rate of 14.4 Kbps and the 2× means that the channel data rate is two times the base data rate. Thus, within an individual time slot the amount of data, or physical layer packet size, that can be transmitted on SCH configured 2×RC5 is:

$$2*14400 \text{ bits/sec}*20 \text{ msec}=576 \text{ bits}=72 \text{ bytes} \quad \text{Eq. 2}$$

Here, because of additional overhead that is added to the physical layer packet, only 64 bytes are available for the application layer data packet, which includes the slice and the slice header. Thus, the second entry in the fourth column of Table 2, for Case 9 is 64. The third entry in the fourth column of Table 2 for Case 9 is the sum of the first and second entries, or 84.

The other entries in Table 2 are determined in a similar manner, where RS2 corresponds to DCCH having a data rate of 14.4 Kbps, corresponding to 36 bytes within a 20 msec time slot of which 31 are available to the application layer. It is noted that there is the dtx operation available for all cases, and that is zero payload size, where no data is transmitted on either channel. When the user data can be transmitted in fewer than the available physical layer slots (of 20 ms each), dtx is used in the subsequent slots, reducing the interference to other users in the system.

As illustrated in Table 2 above, by configuring the multiple fixed data rate channels available, for example DCCH and SCH, a set of CBR channels can behave similarly to a VBR channel. That is, configuring the multiple fixed rate channels can make a CBR channel behave as a pseudo-VBR channel. Techniques that take advantage of the pseudo-VBR channel include determining possible physical layer data packet sizes corresponding to a CBR channel's bit rate from a plurality of available constant bit rate communication channels, and encoding a variable bit rate stream of data thereby creating a plurality of data packets such that a size of each of the data packets is matched to a size of one of the physical layer data packets sizes.

In one embodiment, the configuration of the communication channels is established at the beginning of a session and then either not changed throughout the communication session or only changed infrequently. For example, the SCH discussed in the above example is generally set to a configuration and remains in that configuration throughout the entire session. That is, the SCH described is a fixed rate SCH. In another embodiment, the channel configuration can be changed dynamically during the session. For example a variable rate SCH (V-SCH) can change its configuration for each time slot. That is, during one time slot a V-SCH can be configured in one configuration, such as 2×RC3, and in the next time slot the V-SCH can be configured to a different configuration, such as 16×RC3 or any other possible configuration of V-SCH. A V-SCH provides additional flexibility, and can improve system performance in EBR techniques.

If the configuration of the communication channel is fixed for the entire session, then application layer packets, or slices, are selected so that that they fit into one of the available physical layer data packets that are available. For example, if the DCCH and SCH are configured as RS1 and 2×RC3, as illustrated in Case 1 in Table 2, then the application layer slices would be selected to fit into either 0 byte, 20 byte, 40 byte, or 60 byte packets. Likewise, if the channels were configured as RS1 and 16×RC3, as illustrated in Case 4 of Table 2, then the application layer slices would be selected to fit into either 0 byte, 20 byte, 320 byte, or 340 byte packets. If a V-SCH channel were used then it is possible to change between two different configurations for each slice. For example, if the DCCH is configured as RS1 and V-SCH is configured as RC3, then it is possible to change between any of the V-SCH configurations 2×RC3, 4×RC3, 8×RC3, or 16×RC3, corresponding to Cases 1-4 of Table 2. Selection between these various configurations provides physical layer data packets of 0 byte, 20 byte, 40 byte, 60 byte, 80 byte, 100 byte, 160 byte, 180 byte, 320 byte, or 340 byte as illustrated in Cases 1-4 of Table 2. Thus, in this example, using a V-SCH channel allows application layer slices to be selected to fit into any of the ten different physical layer data packet sizes listed in Cases 1-4 of Table 2.

A similar technique can be used in Wideband CDMA (WCDMA) using a Data Channel (DCH). DCH, similarly to V-SCH, supports different physical layer packet sizes. For example, DCH can support rates of 0 to nx in multiples of 40 octets, where 'nx' corresponds to the maximum allocated rate o the DCH channel. Typical values of nx include 64 kbps, 128 kbps and 256 kbps. In the case of WCDMA, the size of the packet delivered to the data is indicated using additional signalling using "Transport Format Combination Indicator" (TFCI), so that the MS does not have to do blind detectin, thereby reducing the computational burden on the MS, when packets of variable sizes are used as in EBR. The EBR concepts described in this invention are applicable to both blind detection and explicit indication of the packet sizes as with TFCI.

By selecting application layer data packets so that they fit into the physical layer data packets, a combination of constant bit rate communication channels, with their aggregate data rate, can transmit a VBR data stream with performance similar to, and in some cases superior to, a VBR communication channel. In one embodiment, a variable bit rate data stream is encoded into a stream of data packets that are of a size that matches the physical layer data packet size of available communication channels, and are then transmitted over a combination of constant bit rate channels. In another embodiment, as the bit rate of the variable bit rate data stream varies it may be encoded into different sized data packets and a different combinations of constant bit rate channels may be used to transmit the data packets.

For example, different frames of video data may be different sizes and thus, different combinations of fixed bit rate communication channels may be selected to accommodate the transmission of the different sized video frames. In other words, variable bit rate data can be efficiently transmitted over a constant bit rate channel by assigning data packets to at least one of the constant bit rate communication channels so as to match the aggregate bit rate of the constant bit rate communication channels to the bit rate of the variable bit rate stream.

Another aspect is that the encoder can be constrained so as to limit the total number of bits used to represent the variable bit rate data stream to a pre-selected maximum number of bits. That is, if the variable bit rate data stream is a frame of multimedia data, such as video, the frame may be divided into slices where the slices are selected such that each slice can be independently decoded and the number of bits in the slice is limited to a pre-selected number of bits. For example, if the DCCH and SCH channels are configured RS1 and 2×RC3 respectively (Case 1 in Table 2) then the encoded can be constrained so that a slice will be no larger that either 20 bytes, 40 bytes or 60 bytes.

In another embodiment using EBR to transmit multimedia data can use the cdma2000 packet data channel (PDCH). The PDCH can be configured to transmit data packets that are n*45 bytes, where n={1, 2, 4, 8}. Again, using the PDCH the multimedia data, for example video data, can be partitioned into "slices" the match the available physical layer packet sizes. In cdma2000, the PDCH has different data rates available of the forward PDCH (F-PDCH) and the reverse PDCH (R-PDCH). In cdma2000 the F-PDCH has slightly less bandwidth available than the R-PDCH. While this difference in bandwidth can be taken advantage of, in some cases it is advantageous to limit the R-PDCH to the same bandwidth as the F-PDCH. For example, if a first MS transmits a video stream to a second MS, the video stream will be transmitted by the first MS on the R-PDCH and received by the second MS on the F-PDCH. If the first MS used the entire bandwidth of the R-PDCH then some of the data stream would have to be removed to have it conform to the bandwidth of the F-PDCH transmission to the second MS. To alleviate difficulties associated with reformatting the transmission from the first MS so that is can be transmitted to the second MS on a channel with a smaller bandwidth the bandwidth of the R-PDCH can be limited so that it is the same as the F-PDCH. One way to limit the F-PDCH bandwidth is to limit the application data packet sizes sent on the R-PDCH to those supported by the F-PDCH and then add "stuffing bits" for the remaining bits in the R-PDCH physical layer packet. In other words, if stuffing bits are added to the R-PDCH data packets so as to match the F-PDCH data packets, then the R-PDCH data packets can be used on the F-PDCH forward link with minimal change, for example, by just drop the stuffing bits.

Using the technique just described, Table 3 lists possible physical layer data packet sizes for the F-PDCH and R-PDCH for four possible data rate cases, and the number of "stuffing bits" that will be added to the R-PDCH.

TABLE 3

Possible Physical Layer Packet Sizes for PDCH and "Stuffing Bits" for R-PDCH

| Case | n | Physical Layer Packet Size (bytes) F-PDCH and R-PDCH | R-PDCH Stuffing bits |
|---|---|---|---|
| 1 | 1 | 45 | 0 |
| 2 | 2 | 90 | 24 |
| 3 | 4 | 180 | 72 |
| 4 | 8 | 360 | 168 |

As with EBR using DCCH plus SCH, when a multimedia stream, such as a video stream, is portioned into slices, smaller slice sizes generally improve error resiliency, but may compromise compression efficiency. Likewise, if larger slices are used, in general there will be an increase in compression efficiency, but system performance may degrade due to lost packets because the loss of an individual packet results in the loss of more data.

While the above examples have discussed EBR using dedicated channels, DCCH plus SCH in various radio configurations, and shared channel such as PDCH., other channels and combinations of channels can also be used, For example, EBR could use PDCH plus SCH, or PDCH plus DCCH, and all three could be used together. In addition, any of the other channels that are available for transmitting data can be used with EBR.

Likewise, the techniques of matching multimedia data, such as video slices, to an available size of a physical layer packet can be performed in systems based on other over the air standards. For example, in a system based on GSM, or GPRS, or EDGE the multimedia frames, such as video slices, can be sized to match the available timeslots. As noted above, many GSM, GPRS and EDGE devices are capable of receiving multiple timeslots. Thus, depending on the number of timeslots available, an encoded stream of frames can be constrained so that the video slices are matched to the physical packets. In other words, the multimedia data can be encoded so that packet sizes match an available size of a physical layer packet, such as the GSM timeslot, and the aggregate data rate of the physical layer packets used supports the data rate of the multimedia data.

Figure 10:
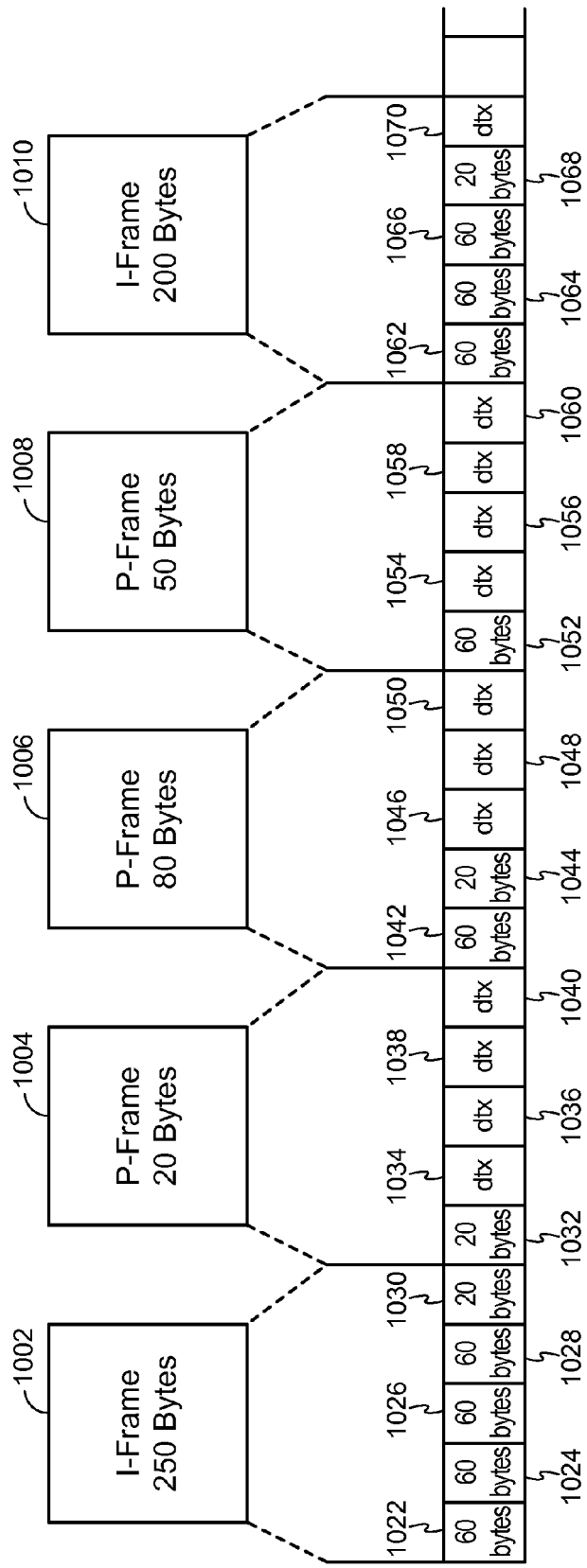
FIG. 10 is a diagram illustrating transmission of a 10 fps video stream using EBR on a cdma2000 system using DCCH and SCH.

FIG. 10 is a diagram illustrating transmission of a 10 fps video stream using EBR on a cdma2000 system using DCCH and SCH. For this example it is assumed that DCCH and SCH are configured RS1 and 2× in RC3 respectively (Case 1 in Table 2). In this configuration there are four physical layer packet sizes, 0, 20, 40 and 60 bytes, available within each 20 msec time slot. Because the video frame rate is 10 fps, for a frame period of 100 msec, up to five time slots can be used to transmit an individual frame of data. Thus, each video frame can be partitioned in up to five slices and each slice can be either 0, 20, 40 of 60 bytes.

In the example of FIG. 10, there are five MPEG-4 video frames 1002, 1004, 1006, 1008, and 1010. Two of the video frames, the first and last, are I frames 1002 and 1010 that contain 250 and 200 bytes of data respectively. The three frames 1004, 1006 and 1008 between the I frames are P frames that contain 20, 80 50 bytes of data respectively. Also shown in FIG. 10 is a data stream that is made up of 20 msec time slots.

As noted above, in this example up to five time slots can be used to transmit each video frame. In this example the frames will be partitioned into slices so as to maximize the amount of time that no data is transmitted, that is maximize the time the channel is in dtx. Selecting partitions in this manner may decrease the overall interference in the communication system by decreasing the amount of time that data is being transmitted. In other examples, other considerations may lead to other selection methods. For example, in some situations it may be desirable to maintain continues, or some minimum level, of communication between a MS and a BS. For example, it may be desired that there be a sufficient level of communication so that a BS may be able to effectively maintain power control of the MS. Thus, it may be desired to partition slices so that some amount of data is transmitted in all, or a desired number, of time slots.

In the example illustrated in FIG. 10, the slices will be sized to use the maximum packet size in the fewest number of time slots to transmit the data. In this example (Case 1 in Table 2) the maximum packet size is 60 bytes, so the frames will be divided into as few 60 byte slices as possible. The first I frame 1002 is 250 bytes, that will be partitioned into five slices, the first four slices will be 60 bytes in size and the fifth slice will be 10 bytes. The encoded slices are assigned to time slots 1022, 1024, 1026, 1028, and 1030. The first four time slots 1022, 1024, 1026, and 1028 are configured to use DCCH+SCH to transmit a 60 byte physical layer packet and the fifth time slot 1030 is configured with DCCH transmitting 10 byte slice and SCH dtx. Thus, the first I frame, that is 250 bytes, is transmitted during the five time slots 1022, 1024, 1026, 1028, and 1030.

It is noted that the 10 byte slice transmitted in time slot 1030 does not completely fill its associated 20 byte physical layer data packet. In a situation like this, when there is excess capacity in the physical layer, stuffing bits can be added to "fill" the physical layer data packet. Or alternatively, the encoding of the slice can be adjusted to take advantage of the extra physical layer capacity. For example, the quantization parameter of the encoded can be increased for the slice and improve the quality of the portion of the video transmitted in the slice. Improving the quality of a portion of the video is advantageous because a subsequent P frame may not require as much data as a result of the improved quality.

The second video frame 1004 is a P frame that is 20 bytes in size. Again, five time slots 1032, 1034, 1036, 1038 and 1040 are available for the transmission of this frame. Because this frame is only 20 bytes, it can be completely transmitted during the first time slot 1032 which is configured so with DCCH transmitting the 20 bytes and SCH dtx. Because the entire frame of data can be transmitted in the first time slot 1032, the remaining four time slots 1034, 1036, 1038, and 1040 available for this frame are configured dtx.

The third video frame 1006 is a P frame that is 80 bytes in size. Again, five time slots 1042, 1044, 1046, 1048 and 1050 are available for the transmission of this frame. Partitioning this video frame into a first slice of 60 bytes leaves 20 bytes in a second slice. Thus, the first slice is transmitted in time slot 1042 which is configured to use DCCH+SCH to transmit the 60 byte slice. The second slice is transmitted in the second time slot 1044 that is configured with DCCH transmitting the 20 bytes and SCH configured dtx. The remaining three time slots 1046, 1048, and 1050 are configured dtx.

The fourth video frame 1008 is a P frame that is 50 bytes in size. Again, five time slots 1052, 1054, 1056, 1058 and 1060 are available for the transmission of this frame. Because the size of this frame is larger that the physical layer packet of either the DCCH or the SCH, the combined DCCH+SCH physical layer packet size of 60 bytes will be used. Because there is insufficient data to fill the DCCH+SCH physical layer packet, stuffing bits, adjusting the encoded to improve the quality, or some other technique, may be utilized to create the physical layer packet. Thus, the slice is transmitted in time slot 1052 which is configured to use DCCH+SCH to transmit the 60 byte slice. The remaining four time slots 1054, 1056, 1058, and 1060 are configured dtx.

The fifth, and final video frame in this example 1010 is an I frame that is 200 bytes in size. Once again, five time slots 1062, 1064, 1066, 1068 and 1070 are available for the transmission of this frame. The frame is partitioned into three 60 byte slices and one 20 byte slice. The three 60 byte slices are transmitted in time slots 1062, 1064, and 1066 which are configured DCCH+SCH to transmit 60 bytes. The fourth slice, that is 20 bytes is transmitted in time slot 1068 that is configured with DCCH transmitting the 20 byte slice and SCH dtx. The final time slot available 1070 for this frame is configured dtx.

In the above example, when a time slot transmitted a data packet that was 20 bytes or less it was assigned to the DCCH. The data packet could also have been assigned to the SCH instead.

Figure 11:
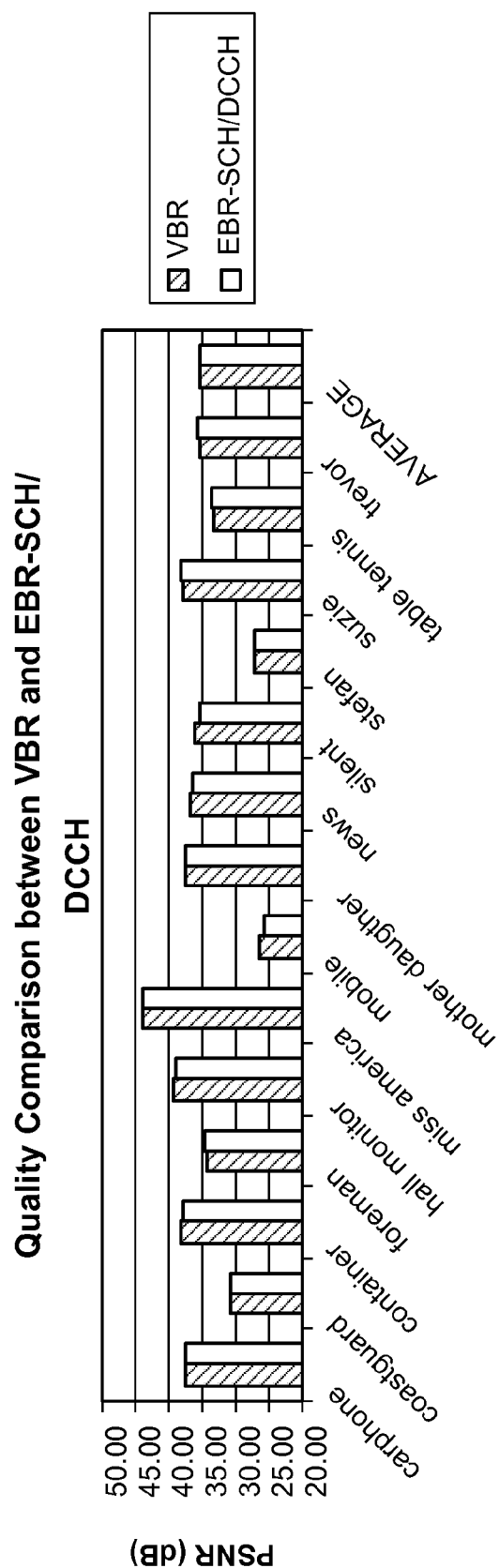
FIG. 11 is a bar chart comparing the quality, as measured by peak signal to noise ration (PSNR), for several sample video sequences transmitted using a variable bit rate channel and an explicit bit rate channel.

FIG. 11 is a bar chart comparing the quality, as measured by peak signal to noise ration (PSNR), for several sample video sequences transmitted using a variable bit rate channel and an explicit bit rate channel. As shown in FIG. 11, the various combinations of channel configurations for DCCH and SCH provide adequate granularity to deliver nearly the same PSNR as compared with traditional VBR. Thus, for these examples, the combination of the ten different date rate combinations over five time slots effectively creates a pseudo variable rate channel that provides performance that is very close to the performance provided by a VBR channel with infinite granularity.

Figure 12:
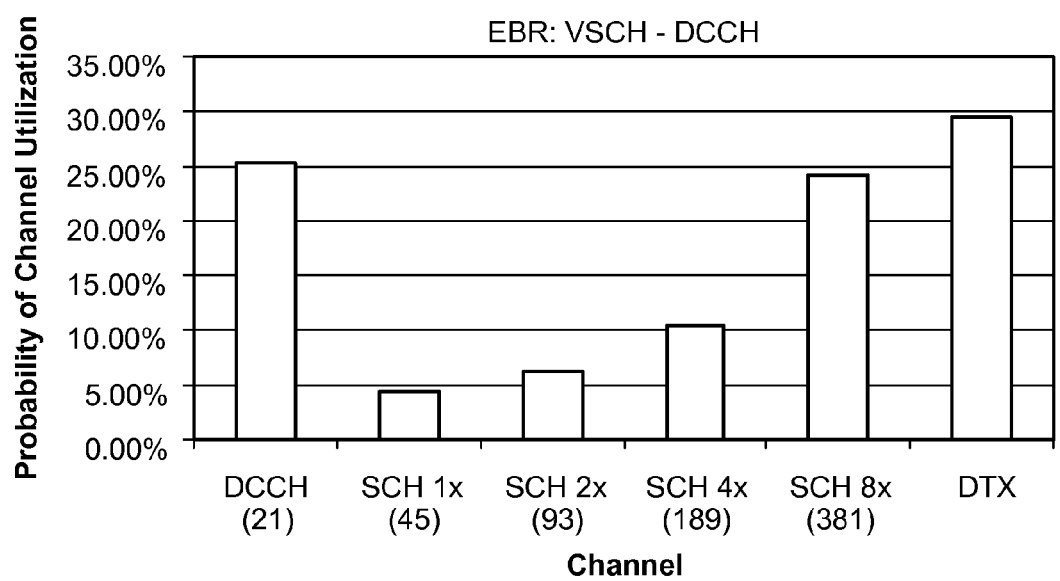
FIG. 12 is a bar chart illustrating a histogram of a typical slice distribution of DCCH and V-SCH, for a typical video clip.

In accordance with an aspect of the EBR technique, for each video frame a spectrum of all possible DCCH and SCH physical layer packet size combinations is generated. Then, a selection of a physical layer packet size that matches a considered slice size is made. Any excess data rate capacity in the selected physical layer packet size may be "filled" by stuffing bytes, or changing encoder parameters to adjust the quality, or other techniques. In the case of using stuffing byes, to minimize the amount of stuffing bytes, a finer Macroblock Quantizer (larger quantization parameter) may be used which results in more slices of smaller size. FIG. 12 is a bar chart illustrating a histogram of a typical slice distribution of DCCH and V-SCH.

As illustrated in FIGS. 11 and 12, and Tables 2 and 3, an appropriate control mechanisms can be used to match the multimedia encoder slice sizes to available physical layer packet, or payload, sizes. A result of this "matching" is that multimedia data, such as video data, can be transmitted over a variable bit rate channel without compromising compression efficiency, and improved error resiliency, when compared to true constant bit rate channel.

Figure 13:
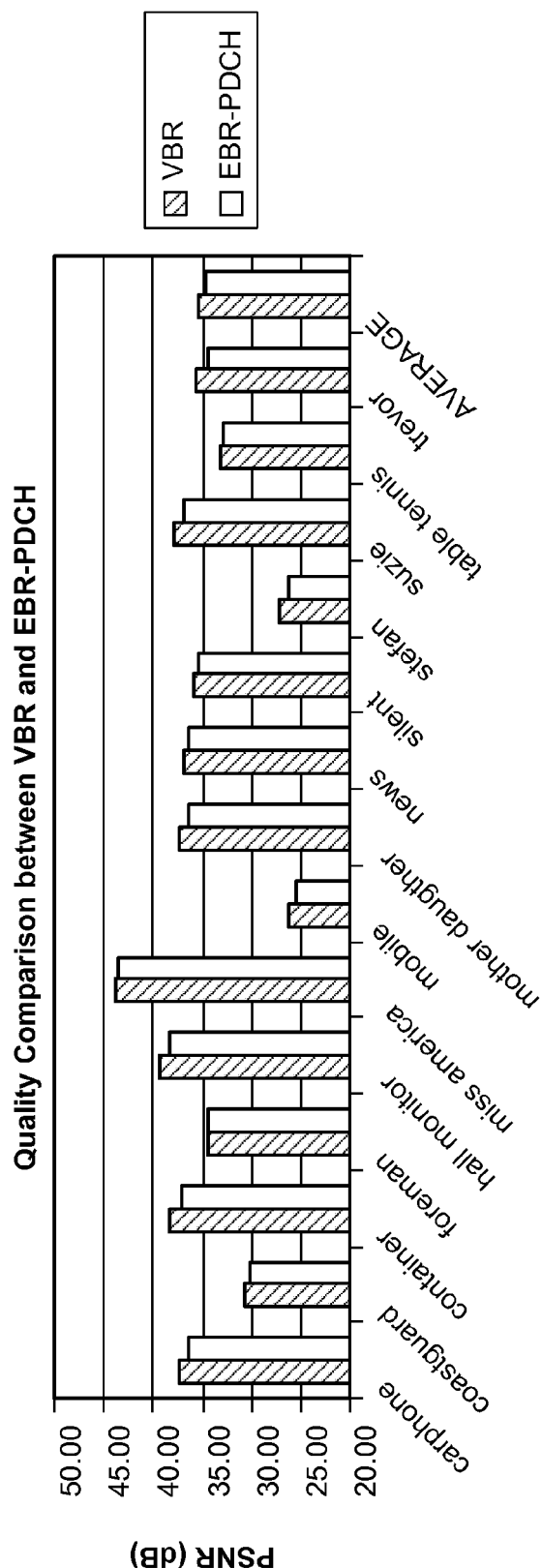
FIG. 13 is a bar chart comparing simulations of the quality, as measured by the peak signal to noise ration (PSNR), of various video sequences transmitted over a VBR channel and an EBR-PDCH channel.

FIG. 13 is a bar chart comparing simulations of the quality, as measured by the peak signal to noise ration (PSNR), of various video sequences transmitted over a VBR channel and an EBR-PDCH channel. As illustrated in FIG. 13, there is a very small decrease in PSNR for the EBR-PDCH transmission as compared to the VBR transmission.

Figure 14:
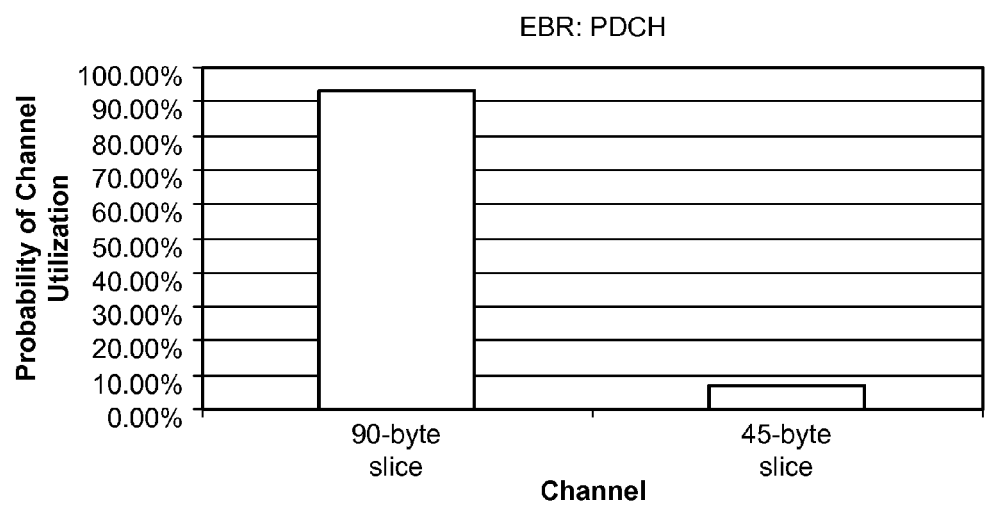
FIG. 14 is a bar chart illustrating the distribution of slice size of a multimedia encoder, constrained for PDCH channel.

FIG. 14 is a bar chart illustrating the distribution of slice size of a multimedia encoder. In this example, the multimedia encoder is constrained to a slice size of 90 bytes, except for the last slice of each multimedia frame, which has the option of being either 90 bytes or 45 bytes in size. As shown in FIG. 14, in this example, over 90% of the slices are 90 bytes in size, leading to efficient channel utilization without degradation due to packet losses because of larger packet sizes.

The quality comparison charts of FIGS. 13 and 14, illustrate that use of an appropriate control mechanism, in the case of EBR-PDCH, to match the multimedia encoder, or codec, slice sizes to available physical layer packet sizes can result in high quality transmission of multimedia data without compromising compression efficiency when compared to true VBR.

The above examples, illustrate that multimedia encoders, such as AVC/H.264 video codec, can achieve similar compression efficiency in EBR and VBR modes. As shown by the above examples, EBR, in both a dedicated channel, such as DCCH plus V-SCH, and a shared channel, such as PDCH, achieves performance similar to VBR. Because other multimedia encoders, such as video codecs (e.g. MPEG-4 and H.263+) use Motion Estimation and DCT transformation on the displaced block differences, it is expected that similar EBR operation is possible for other video codecs and other wireless channels. Further, note that rate control mechanisms are left for implementation in ITU and ISO/IEC video codec specifications. Hence, EBR is compliant with existing Standards, and a compliant decoder will be able to decode video streams encoded in EBR rate control.

While the above examples have been described for a system based on CDMA, such as cdma2000, the same techniques are applicable to other air interfaces. For example, a system based on GSM, GPRS, or EDGE, may use the same techniques as described above. As noted in FIG. 3, these systems transmit data within multiple time slots of a radio frame. Selecting multimedia slice size based on the number of time slots, and thus the available data rate, would be similar to selecting slice size based on the available channels in a system based on CDMA. Likewise, by sizing the slices to match the time slots, similarly to sizing the slices to match the CDMA physical packets, error resiliency is improved.

As illustrated in these examples, an aspect of EBR is matching slices of multimedia data frames to an available set of physical layer packet sizes, for example, as defined for cdma2000 (V-SCH+DCCH, SCH+DCCH, PDCH), and WCDMA (DCH). In one embodiment, the recipient node, for example, a MS, negotiates the communication channel configuration, and thus the physical layer packer size, with a PDSN in the infrastructure. For streaming and broadcast applications, there may be a negotiation between a MS and a content server, in addition to a negotiation the MS and a PDSN. Thus, there is end-to-end coordination between the end-point applications and the underlying network.

According to one embodiment, a first channel includes a variable rate, and thus variable physical layer packet size, channel that is possibly made of multiple logical channels including some variable bit rate and constant bit rate channels. A video encoder may include a rate control buffer that supports shaping of video traffic that allows transmission of the video information with zero buffer-delay. The constant bit rate channel may include a Dedicated Control Channel (DCCH) over which, for example, P-type video frames are transmitted. A second wireless channel may also be provided that includes, for example, a Variable-rate Supplemental Channel (V-SCH) that is shared among multiple recipient nodes. The second wireless channel may have a rate greater than that of the first wireless channel. In some embodiments, I-type video frames are transmitted on the Variable-rate Supplemental Channel (V-SCH).

According to one aspect of the invention, each video frame is sent over a number of physical layer frames. For example, the Dedicated Control Channel (DCCH) has a first rate and the Variable-rate Supplemental Channel (V-SCH) has multiple rates such as the first rate, a second rate, a third rate, a fourth rate and a fifth rate. In addition, both channels have a DTX rate in which nothing is transmitted. During the duration of each physical layer frame, a number of transmission formats are defined for each combination of rates of the Dedicated Control Channel (DCCH) and the Variable-rate Supplemental Channel (V-SCH). A number of configurations is at least the product of the number of transmission formats and the number of physical layer frames. The slice sizes of the video frames may correspond to one of the configurations based on the size of the video frame. The encoder may include a rate control module that, based on the size of the video frame, selects a desired slice size and configuration that matches an available size of a physical layer packet. As such, video latency can be reduced for both dedicated and shared channels by matching the encoding rate to one of the available channel rates.

In one technique the size of the data delivered is estimated by the MS and this process is called "Blind Detection." In another technique, referred to as "Explicit Indication" the size of the data delivered can be indicated using additional signaling, thereby eliminating the need to do blind detection. For example, in the case of WCDMA, the size of the data packet delivered may be indicated using "Transport Format Combination Indicator" (TFCI), so that the MS does not have to do blind detection, thereby reducing the computational burden on the MS, when packets of variable sizes are used as in EBR. The EBR concepts described are applicable to both blind detection and explicit indication of the packet sizes. Thus, while it is clear that the physical layer packet sizes arriving at the MS may be of different sizes over time, the MS can identify the size of the packets either by blind detection or via explicit signaling of the packet size, as with TFCI in WCDMA.

According to another aspect, the SCH assignment is of very low rate (e.g. 32 kbps). This is done so that many more users can be supported in the network without depleting the Walsh space. In this case, the video quality is improved by allowing n video frames to occupy the time slots in n*T seconds, where T=1/frames_pers_second.

Figure 15:
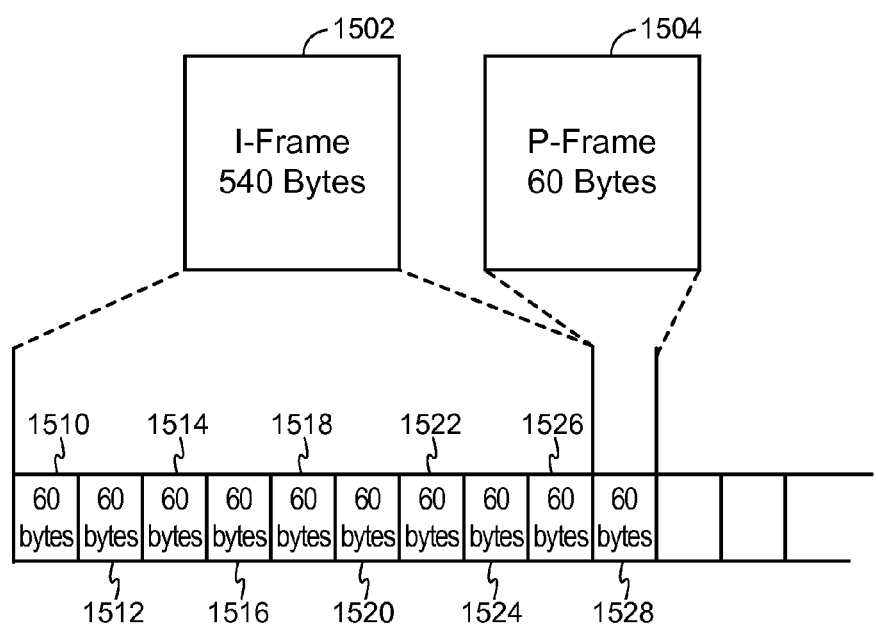
FIG. 15 is a diagram illustrating an example of transmitting two 10 fps video frames over a 200 msec period, with the I frame utilizing more time slots than the neighboring P frame.

In another embodiment, instead of restricting each video frame to T seconds, n video frames share n*T seconds. For example, if a video stream has a 10 fps rate, then instead of transmitting a frame every 100 msec it is possible to transmit two frames every 200 msec. FIG. 15 is a diagram illustrating an example of transmitting two 10 fps video frames over a 200 msec period. In the example of FIG. 15, it is assumed that DCCH and SCH are configured RS1 and 2× in RC3 respectively (Case 1 in Table 2). In this configuration there are four physical layer packet sizes, 0, 20, 40 and 60 bytes, available each 20 msec time slot. In this example two 10 fps video frames are transmitted every 200 msec. Thus, the two video frames share ten time slots within which both frames of data is transmitted. Thus, each video frame can be partitioned in slices that can be either 0, 20, 40 of 60 bytes so that the combined total number of slices for the two frames is ten of fewer slices.

In the example of FIG. 15, there are two MPEG-4 video frames 1502 and 1004. The first video frame 1502 is an I frame that is 540 bytes in size, and the second video frame 1504 is a P frame that is 60 bytes in size. In this example, the I frame 1502 can be divided into nine slices, each 60 bytes in size, and the P frame 1504 can be divided into one slice that is 60 bytes in size. The I frames 1502 slices can be transmitted during nine time slots 1510, 1512, 1514, 1516, 1518, 1520, 1522, 1524, and 1526 that are configured to use DCCH+SCH to transmit a 60 byte physical layer packets. The P frame 1504 slice can be transmitted during a single time slot 1518 that is configured to use DCCH+SCH to transmit a 60 byte physical layer packet. Thus, two 10 fps video frames are transmitted during a 200 msec period, resulting in an average rate of 10 fps.

As illustrated in FIG. 15, instead of restricting each video frame to T seconds, n video frames share n*T seconds. Thus, a trade off is achieved between frequency domain limitations (peak rate, Walsh space) and time domain limitations (delay). In this example, the I frame 1502 was allocated nine time slots and the P frame 1504 was allocated one time slot. It is envisioned that any other allocation of time slots between frames can also be used. For example, eight, seven, or six time slots can be allocated to one frame and two, three or four time slots, respectively, allocated to another frame. Also, this example illustrated sharing time slots between two frames, but it is also envisioned that time slots can be shared between any number of frames.

According to another embodiment, the first channel comprises a variable bit rate channel that supports multiple rates, such as a shared Packet Data Channel (PDCH) with variable delay. The rate of the variable bit rate channel is matched to the encoding rate of the packets of video information from the video encoder. The controller may include a scheduler that arbitrates resources to the recipient nodes to ensure that the controller transmits video information over the first wireless channel with a fixed delay. According to another aspect of the invention, the recipient node restricts the R-PDCH rates to match F-PDCH rates by imposing stuffing bits. According to another aspect of the invention, the scheduler in the controller uses delay for SMG in PDCH.

In another embodiment, a third wireless channel may also be provided. The sending node may further comprise an audio encoder that produces frames of audio/speech information. The serving node receives the frames of audio/speech information from the sending node and serves the packets of audio/speech information to the controller. The controller transmits packets of audio/speech information to at least one of the recipient nodes over the third wireless channel. For reverse link or up link transmissions, each recipient node may transmit packets of audio/speech information to the controller over the third wireless channel.

Figure 16:
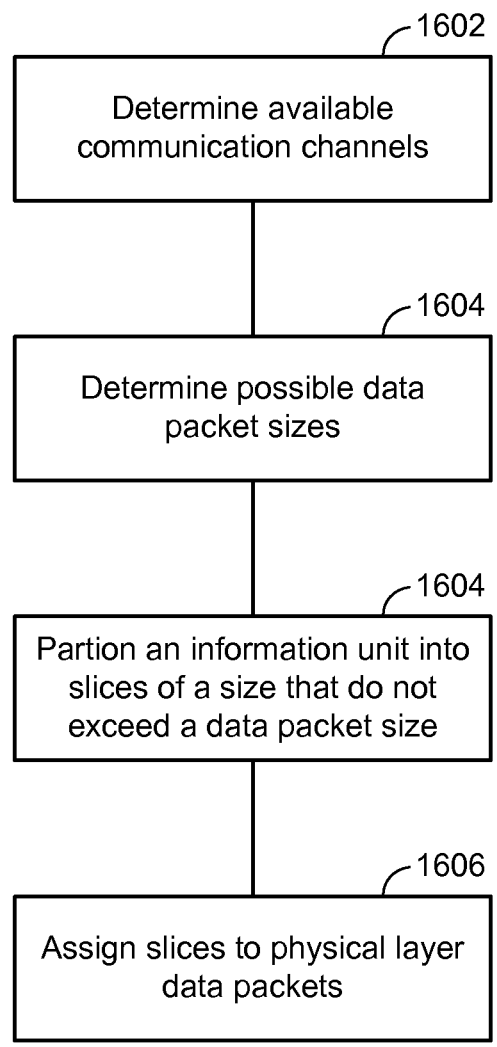
FIG. 16 is a flow diagram illustrating a method transmitting information data over a wireless communication channel.

FIG. 16 is a flow diagram illustrating a method of transmitting multimedia data over a wireless communication channel. Flow begins in block 1602 where available communication channels that can be used to transmit information are determined. For example, the available communication channels, and their configuration, can be negotiated between content servers, or PSDN and recipients of the contents. Flow continues to block 1604 where possible data packet sizes of the available communication channels are determined, as well as packet sizes of combinations of communication channels. Then an information unit is partitioned into slices. The number of slices may be determined by the number of time slots available for the transmission during the information unit interval, and the slice size is selected so that it does not exceed one of the data packet sizes available. For example, the number of slices can depend on the number of transmissions that occur during the information unit interval. Flow continues to block 1608 and the slices are assigned to the physical layer packets.

Figure 17:
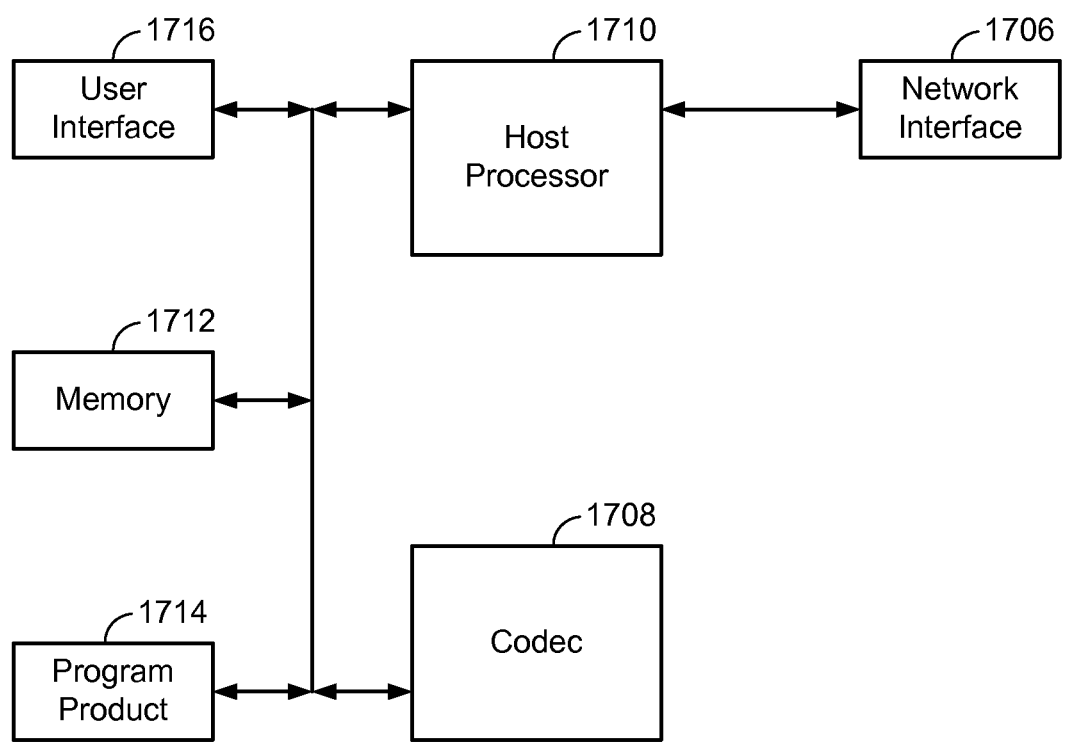
FIG. 17 is a block diagram of a wireless communication device, or a mobile station (MS), constructed in accordance with an exemplary embodiment of the present invention.

FIG. 17 is a block diagram of a wireless communication device, or a mobile station (MS), constructed in accordance with an exemplary embodiment of the present invention. The communication device 1702 includes a network interface 1706, codec 1708, a host processor 1710, a memory device 1712, a program product 1714, and a user interface 1716.

Signals from the infrastructure are received by the network interface 1706 and sent to the host processor 1710. The host processor 1710 receives the signals and, depending on the content of the signal, responds with appropriate actions. For example, the host processor 1710 may decode the received signal itself, or it may route the received signal to the codec 1708 for decoding. In another embodiment, the received signal are sent directly to the codec 1708 from the network interface 1706.

In one embodiment, the network interface 1706 may be a transceiver and an antenna to interface to the infrastructure over a wireless channel. In another embodiment, the network interface 1706 may be a network interface card used to interface to the infrastructure over landlines. The codec 1708 may be implemented as a digital signal processor (DSP), or a general processor such as a central processing unit (CPU).

Both the host processor 1710 and the codec 1708 are connected to a memory device 1712. The memory device 1712 may be used to store data during operation of the WCD, as well as store program code that will be executed by the host processor 2210 or the DSP 2208. For example, the host processor, codec, or both, may operate under the control of programming instructions that are temporarily stored in the memory device 1712. The host processor 1710 and codec 1708 also can include program storage memory of their own. When the programming instructions are executed, the host processor 1710 or codec 1708, or both, perform their functions, for example decoding or encoding multimedia streams. Thus, the programming steps implement the functionality of the respective host processor 1710 and codec 1708, so that the host processor and codec can each be made to perform the functions of decoding or encoding content streams as desired. The programming steps may be received from a program product 1714. The program product 1714 may store, and transfer the programming steps into the memory 1712 for execution by the host processor, codec, or both.

The program product 1714 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 1714 may be the source file including the program steps that is received from the network and stored into memory and is then executed. In this way, the processing steps necessary for operation in accordance with the invention may be embodied on the program product 1714. In FIG. 17, the exemplary storage medium is shown coupled to the host processor 1710 such that the host processor may read information from, and write information to, the storage medium. Alternatively, the storage medium may be integral to the host processor 1710.

The user interface 1716 is connected to both the host processor 1710 and the codec 1708. For example, the user interface 1716 may include a display and a speaker used to output multimedia data to the user.

Those of skill in the art will recognize the step of a method described in connection with an embodiment may be interchanged without departing from the scope of the invention.

Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting information over a wireless communication system, the method being performed using a computing device and comprising:
   determining a number of transmissions over available communication channels in the wireless communication system that can occur-during an interval of an information unit; and
   partitioning the information unit into a number of slices, wherein each of the slices is independently decodable, and wherein the number of slices is equal to or less than the determined number of transmissions and sizes of the slices do not exceed one of a plurality of packet sizes of the available communication channels.

2. A method as defined in claim 1, wherein partitioning the information unit is performed using an encoder configured to perform rate control.

3. A method as defined in claim 1, wherein the information unit comprises a variable bit rate data stream.

4. A method as defined in claim 1, wherein the information unit comprises video data.

5. A method as defined in claim 1, wherein the information unit comprises audio data.

6. A method as defined in claim 1, wherein the communication system is a CDMA system.

7. A method as defined in claim 1, wherein the communication system is a time slot communication system wherein physical layer packets are transmitted in time slots.

8. A method as defined in claim 1, wherein said partitioning comprises:
   determining possible physical layer data packet sizes of the available communication channels; and
   constraining the slices such that they have a size that does not exceed at least one of the determined physical layer data packet sizes of the available communication channels.

9. A method as defined in claim 1, wherein the communication system is a GSM system.

10. A method as defined in claim 1, wherein the communication system is an EDGE system.

11. A method as defined in claim 1, wherein the communication system is a GPRS system.

12. A method of transmitting information over a wireless communication system, the method being performed using a computing device and comprising:
   determining a number of transmissions in available communication channels that can occur-during an interval of an information unit;
   determining possible physical layer data packet sizes of the available communication channels; and
   partitioning the information unit into slices, wherein each of the slices is independently decodable, and wherein the number of slices is equal to or less than the determined number of transmissions, and the sizes of the slices are selected so as not to exceed one of the determined physical layer data packet sizes of the available communication channels.

13. A method as defined in claim 12, wherein partitioning the information unit employs a source encoder configured to perform rate control and capable of generating slices of various sizes.

14. A method as defined in claim 12 wherein the information unit is one of a plurality of information units and wherein the plurality of information units is produced by an information source at a constant rate.

15. A method as defined in claim 14, wherein the plurality of information units are frames of information.

16. A method as defined in claim 12, wherein the information unit comprises a variable bit rate data stream.

17. A method as defined in claim 12, wherein the information unit comprises multimedia data.

18. A method as defined in claim 12, wherein the information unit comprises video data.

19. A method as defined in claim 12, wherein the information unit comprises audio data.

20. A method as defined in claim 12, wherein the communication channels are CDMA channels.

21. A method as defined in claim 12, wherein the communication channels are GSM channels.

22. A method as defined in claim 12, wherein the communication channels are EDGE channels.

23. A method as defined in claim 12, wherein the communication channels are GPRS channels.

24. A method as defined in claim 12, wherein the communication channels are time slot channels.

25. A method as defined in claim 12, further comprising constraining an encoder to partition the information unit into slices, wherein the sizes of the slices are equal to or less than the determined physical layer data packet sizes.

26. A method as defined in claim 12, further comprising constraining an encoder to partition the information unit into of slices such that the number of slices is equal to or less than the number of transmissions during the interval of the information unit.

27. A method of transmitting information over a wireless communication system, the method performed using a computing device and comprising:
   determining a number of transmissions over available communication channels in the wireless communication system that can occur during an interval of a video frame; and
   partitioning the video frame into a number of slices, wherein each of the slices includes at least one macro block, and wherein the number of slices is equal to or less than the determined number of transmissions and sizes of the slices do not exceed one of a plurality of packet sizes of the available communication channels.

28. A wireless communication device comprising:
   a controller configured to determine physical layer packet sizes of available communication channels; and
   an encoder configured to partition data contained in an information unit into slices, wherein each of the slices is independently decodable, and wherein the number of slices is equal to or less than the number of transmissions available for transmitting the information unit having an interval during the interval of the information unit, and the sizes of the slices are selected not to exceed one of the physical layer packet sizes of the available communication channels.

29. A wireless communication device as defined in claim 28 further comprising a transmitter configured to transmit physical layer packets.

30. A wireless communication device as defined in claim 28, wherein the information unit comprises a variable bit rate data stream.

31. A wireless communication device as defined in claim 28, wherein the information unit comprises multimedia data.

32. A wireless communication device as defined in claim 28, wherein the information unit comprises video data.

33. A wireless communication device as defined in claim 28, wherein the information unit comprises audio data.

34. A wireless communication device as defined in claim 28, wherein the information unit is one of a plurality of information units.

35. A wireless device as defined in claim 34, wherein the plurality of information units are produced by an information source at a constant rate.

36. A wireless communication device as defined in claim 28, wherein the available communication channels are CDMA channels.

37. A wireless communication device as defined in claim 28, wherein the available communication channels are GSM channels.

38. A wireless communication device as defined in claim 28, wherein the available communication channels are GPRS channels.

39. A wireless communication device as defined in claim 28, wherein the available communication channels are EDGE channels.

40. A non-transitory computer-readable media comprising a program code for performing a method of encoding data for transmission in a wireless communication system, the program code comprising program instructions that, when executed by a processor, cause the processor to perform operations comprising:
  determining a number of transmissions over available communication channels in the wireless communication system that can occur-during an interval of an information unit; and
  partitioning the information unit into a number of slices, wherein each of the slices is independently decodable, and wherein the number of slices is equal to or less than the determined number of transmissions and sizes of the slices do not exceed one of a plurality of packet sizes of the available communication channels.

41. A non-transitory computer-readable media comprising a program code for performing a method of encoding data for transmission in a wireless communication system, the program code comprising program instructions that, when executed by a processor, cause the processor to perform operations comprising:
  determining possible physical layer packet sizes of available communication channels;
  determining a number of transmissions over the available communication channels that can occur during an interval of an information unit; and
  partitioning data contained in the information unit into a number of slices, wherein each of the slices is independently decodable, and wherein the number of slices is equal to or less than the determined number of transmissions and sizes of the slices do not exceed one of the possible physical layer packet sizes.

42. An apparatus for transmitting information over a wireless communication system, comprising:
  means for determining a number of transmissions over available communication channels in the wireless communication system that can occur during an interval of an information unit; and
  means for partitioning the information unit into a number of slices, wherein each of the slices is independently decodable, and wherein the number of slices is equal to or less than the determined number of transmissions and sizes of the slices do not exceed one of a plurality of packet sizes of the available communication channels.

43. An apparatus as defined in claim 42, wherein the means for partitioning the information unit comprises an encoder configured to perform rate control.

44. An apparatus as defined in claim 42, wherein the information unit comprises a variable bit rate data stream.

45. An apparatus as defined in claim 42, wherein the information unit comprises video data.

46. An apparatus as defined in claim 42, wherein the information unit comprises audio data.

47. An apparatus as defined in claim 42, wherein the wireless communication system is a CDMA system.

48. An apparatus as defined in claim 42, wherein the wireless communication system is a time slot communication system wherein physical layer packets are transmitted in time slots.

49. An apparatus as defined in claim 42, wherein said means for partitioning comprises:
  means for determining possible physical layer data packet sizes of the available communication channels; and
  means for constraining the slices such that each of the slices has a size that does not exceed at least one of the physical layer data packet sizes of the available communication channels.

50. An apparatus as defined in claim 42, wherein the wireless communication system is a GSM system.

51. An apparatus as defined in claim 42, wherein the wireless communication system is an EDGE system.

52. An apparatus as defined in claim 42, wherein the wireless communication system is a GPRS system.

53. An apparatus for transmitting information over a wireless communication system, comprising:
  means for determining a number of transmissions in available communication channels that can occur during an interval of an information unit;
  means for determining possible physical layer data packet sizes of the available communication channels; and
  means for partitioning the information unit into a number of slices, wherein each of the slices is independently decodable, and wherein the number of slices is equal to or less than the determined number of transmissions, and sizes of the slices are selected so as not to exceed one of the physical layer data packet sizes of the available communication channels.

54. An apparatus as defined in claim 53, wherein the means for partitioning information comprises a source encoder configured to perform rate control and capable of generating slices of various sizes.

55. An apparatus as defined in claim 53, the information unit is one of a plurality of information units and wherein the plurality of information units is produced by an information source at a constant rate.

56. An apparatus as defined in claim 55, wherein the plurality of information units are frames of information.

57. An apparatus as defined in claim 53, wherein the information unit comprises a variable bit rate data stream.

58. An apparatus as defined in claim 53, wherein the information unit comprises multimedia data.

59. An apparatus as defined in claim 53, wherein the information unit comprises video data.

60. An apparatus as defined in claim 53, wherein the information unit comprises audio data.

61. An apparatus as defined in claim 53, wherein the communication channels are CDMA channels.

62. An apparatus as defined in claim 53, wherein the communication channels are GSM channels.

63. An apparatus as defined in claim 53, wherein the communication channels are EDGE channels.

64. An apparatus as defined in claim 53, wherein the communication channels are GPRS channels.

65. An apparatus as defined in claim 53, wherein the communication channels are time slot channels.

66. An apparatus as defined in claim 53, wherein the means for partitioning comprises a means for constraining an encoder to partition the information unit into the number of slices such that the sizes of the slices are equal to or less than one of the physical layer data packet sizes.

67. An apparatus as defined in claim 53, wherein the means for partitioning comprises a means for constraining an encoder to partition the information unit into the number of slices such that the number of slices is equal to or less than the determined number of transmissions during the interval of the information unit.

* * * * *